(12) United States Patent
Yang et al.

(10) Patent No.: US 11,401,472 B2
(45) Date of Patent: Aug. 2, 2022

(54) WASHING AND DESALTING DEVICE, WASHING AND DESALTING METHOD, DESALTING AND DEHYDRATING SYSTEM, AND DESALTING AND DEHYDRATING METHOD

(71) Applicants: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

(72) Inventors: Xiuna Yang, Liaoning (CN); Zonglin Ruan, Liaoning (CN); Huimin Qi, Liaoning (CN); Ping Jin, Liaoning (CN)

(73) Assignees: CHINA PETROLEUM & CHEMICAL CORPORATION, Beijing (CN); DALIAN RESEARCH INSTITUTE OF PETROLEUM AND PETROCHEMICALS, SINOPEC CORP., Liaoning (CN)

( * ) Notice: Subject to any disclaimer, the term of this patent is extended or adjusted under 35 U.S.C. 154(b) by 60 days.

(21) Appl. No.: 16/755,438

(22) PCT Filed: Oct. 9, 2018

(86) PCT No.: PCT/CN2018/109418
§ 371 (c)(1),
(2) Date: Apr. 10, 2020

(87) PCT Pub. No.: WO2019/072159
PCT Pub. Date: Apr. 18, 2019

(65) Prior Publication Data
US 2020/0239788 A1 Jul. 30, 2020

(30) Foreign Application Priority Data

Oct. 10, 2017 (CN) .......................... 201710934897.9

(51) Int. Cl.
*C10G 33/02* (2006.01)
*C10G 53/02* (2006.01)
(Continued)

(52) U.S. Cl.
CPC .......... *C10G 33/02* (2013.01); *B01D 11/0449* (2013.01); *B01D 11/0488* (2013.01);
(Continued)

(58) Field of Classification Search
CPC ........... B01D 11/0449; B01D 11/0488; B01D 17/02; B01D 17/04; B01D 17/045;
(Continued)

(56) References Cited

U.S. PATENT DOCUMENTS 2,728,714 A * 12/1955 Winkler ................. C10G 31/08
208/251 R
3,616,460 A * 10/1971 Watson .................. C10G 33/02
204/665
(Continued)

FOREIGN PATENT DOCUMENTS

CN 202390263 U 8/2012
CN 103706149 A 4/2014
(Continued)

OTHER PUBLICATIONS

Cai (CN 105087057) machine translation and original (Year: 2015).*
(Continued)

*Primary Examiner* — Liam Royce
(74) *Attorney, Agent, or Firm* — Novick, Kim & Lee, PLLC; Allen Xue

(57) ABSTRACT

A washing and desalting device includes a first shell and a plurality of filaments. The first shell has a first receiving
(Continued)

cavity and is provided with a liquid inlet and a liquid outlet that communicate with the first receiving cavity. The plurality of the filaments is provided in the first receiving cavity, and the length direction of each of the filaments is consistent with that of the first receiving cavity. The device can be incorporated in a washing and dehydrating system.

19 Claims, 10 Drawing Sheets

(51) Int. Cl.
| | | |
|---|---|---|
| B01D 11/04 | (2006.01) | |
| B01D 17/02 | (2006.01) | |
| B01D 17/04 | (2006.01) | |
| C10G 31/08 | (2006.01) | |
| C10G 33/06 | (2006.01) | |

(52) U.S. Cl.
CPC ............ *B01D 17/02* (2013.01); *B01D 17/04* (2013.01); *C10G 31/08* (2013.01); *C10G 33/06* (2013.01); *C10G 53/02* (2013.01); *B01D 17/045* (2013.01); *C10G 2300/104* (2013.01); *C10G 2300/302* (2013.01); *C10G 2300/308* (2013.01)

(58) Field of Classification Search
CPC ........ B01D 17/00; C10G 33/02; C10G 33/06; C10G 33/00; C10G 31/08; C10G 53/02; C10G 2300/104; C10G 2300/302; C10G 2300/308
See application file for complete search history.

(56) References Cited

U.S. PATENT DOCUMENTS

| | | | | |
|---|---|---|---|---|
| 3,936,489 | A * | 2/1976 | Rozsa | B01D 11/0449 422/255 |
| 3,992,156 | A * | 11/1976 | Clonts | C10G 19/02 208/263 |
| 4,199,447 | A * | 4/1980 | Chambers | B01D 17/045 210/DIG. 5 |
| 4,278,545 | A * | 7/1981 | Batutis | B01D 21/0006 210/DIG. 5 |
| 4,753,722 | A | 6/1988 | Le et al. | |
| 5,518,610 | A * | 5/1996 | Pierpoline | B01D 17/045 210/DIG. 5 |
| 5,779,897 | A | 7/1998 | Kalthod et al. | |
| 2006/0096263 | A1* | 5/2006 | Kahlbaugh | B01D 46/71 55/528 |
| 2014/0014593 | A1 | 1/2014 | Mcgehee et al. | |

FOREIGN PATENT DOCUMENTS

| | | | |
|---|---|---|---|
| CN | 103980934 A * | 8/2014 | ............... C02F 1/40 |
| CN | 203999512 U | 12/2014 | |
| CN | 205152156 U | 4/2016 | |
| CN | 106281411 A | 1/2017 | |
| CN | 205965121 U | 2/2017 | |
| CN | 105087057 B | 5/2017 | |
| WO | 2014011574 A2 | 1/2014 | |

OTHER PUBLICATIONS

Liu (CN 103980934) machine translation and original (Year: 2014).*

* cited by examiner

WASHING AND DESALTING DEVICE, WASHING AND DESALTING METHOD, DESALTING AND DEHYDRATING SYSTEM, AND DESALTING AND DEHYDRATING METHOD

FIELD OF THE INVENTION

The present disclosure relates to the field of petrochemical industry, particularly to a washing and desalting device, a washing and desalting method, a desalting and dehydrating system, and a desalting and dehydrating method.

BACKGROUND OF THE INVENTION

Crude oil contains water and inorganic salts such as sodium chloride, calcium chloride and magnesium chloride, etc., and must be subjected to dehydration and desalting treatment before it can be refined. In the prior art, a small amount of water is injected into crude oil first to wash and dissolve the salts in the crude oil, and then the brine is separated out by means of an electrodesalting and electrodehydrating technique.

Though acceptable crude oil can be obtained by using the electrodesalting and electrodehydrating technique to carry out dehydration and desalting for non-inferior and non-heavy crude oil, the oil content index in the resultant waste water can't meet the specification since the oil-water separation is not fine and accurate enough.

When dehydration and desalting is carried out for inferior heavy crude oil with the electrodesalting and electrodehydrating technique, the crude oil and water can't contact dispersedly and can't be mixed homogeneously owing to the high viscosity of the inferior heavy crude oil. Consequently, the salts in the crude oil can't be removed even if a large amount of water is injected.

In addition, the water in oil products such as inferior crude oil, heavy oil, coal tar, oil sand asphalt, heavy sump oil, etc. is in a severely emulsified state, consequently some components in the crude oil can't be polarized, and ideal desalting and oil-water separation effects can't be attained. Inferior crude oil, heavy oil, coal tar, oil sand asphalt, heavy sump oil and other similar oil products have high density and a small density difference from water. The electrodesalting and electrodehydrating technique has a disadvantage of long retention time and can't meet the separation requirements.

In order to meet the separation requirements as far as possible, the electrodesalting and electrodehydrating technique ensures the salt content and water content index by increasing the number of electrodesalting stages (four or five stages) and increasing the amount of injected water, resulting in long retention time, large quantity of waste water, and high power consumption, etc.

SUMMARY OF THE INVENTION

To solve the problems in the prior art, the present disclosure provides a washing and desalting device, a washing and desalting method, a desalting and dehydrating system, and a desalting and dehydrating method.

To attain the above object, in a first aspect, the present disclosure provides a washing and desalting device, which comprises: a first shell, which has a first receiving cavity and is provided with a liquid inlet and a liquid outlet that communicate with the first receiving cavity; and a plurality of filaments provided in the first receiving cavity, wherein preferably the length direction of each of the filaments is consistent with that of the first receiving cavity, preferably the filling density of the plurality of filaments is 1%-9%, more preferably the filling density of the plurality of filaments is 3%-5%.

The washing and desalting device according to the embodiments of the present disclosure has advantages including high desalting efficiency, complete desalting, low energy consumption, and simple structure, etc.

Preferably, each of the filaments is configured in a serpentine shape.

Preferably, the washing and desalting device further comprises a first mounting member and a second mounting member that are provided on the wall surface of the first receiving cavity in a spaced manner in the length direction of the first receiving cavity, wherein a first end of each filament is connected with the first mounting member, and a second end of each filament is connected with the second mounting member, preferably the first end of each filament is adjacent to the liquid inlet of the first receiving cavity in the length direction of the first receiving cavity, and the second end of each filament is adjacent to the liquid outlet of the first receiving cavity in the length direction of the first receiving cavity.

Preferably, the washing and desalting device further comprises a first material distributor provided in the first receiving cavity and disposed between the liquid inlet of the first receiving cavity and the first end of the filament in the length direction of the first receiving cavity, wherein a liquid inlet of the first material distributor communicates with the liquid inlet of the first receiving cavity.

Preferably, the washing and desalting device further comprises a limiting member that is provided on the wall surface of the first receiving cavity, the limiting member comprises a first limiting part and a second limiting part that are spaced apart in a first direction perpendicular to the length direction of the first receiving cavity, wherein each filament is disposed between the first limiting part and the second limiting part in the first direction, preferably a plurality of limiting members are arranged in a spaced manner in the length direction of the first receiving cavity.

Preferably, the first shell is provided with a circulating liquid outlet communicating with the first receiving cavity, and the washing and desalting device further comprises a circulating pump with a liquid inlet communicating with the circulating liquid outlet and a liquid outlet communicating with the liquid inlet of the first shell, preferably the circulating liquid outlet is opposite to the liquid outlet of the first shell in the first direction which is perpendicular to the length direction of the first receiving cavity.

Preferably, the cross section of the first receiving cavity is circular, and the ratio of the length of the first receiving cavity to the diameter of the cross section of the first receiving cavity is (10-100):1, preferably the ratio of the length of the first receiving cavity to the diameter of the cross section of the first receiving cavity is (30-70):1, more preferably the ratio of the length of the first receiving cavity to the diameter of the cross section of the first receiving cavity is (40-50):1.

Preferably, each of the filaments is an oleophilic and hydrophobic filament, or some of the plurality of filaments are oleophilic and hydrophobic filaments, while the others of the plurality of filaments are metal filaments, preferably, the metal filaments are stainless steel filaments, preferably the oleophilic and hydrophobic filaments are selected from at least one of polyester filaments, nylon filaments, polyurethane filaments, polypropylene filaments, polyacrylonitrile filaments, and polyvinyl chloride filaments, preferably the plurality of filaments form a plurality of filament bundles, and some filaments in each filament bundle are the oleophilic and hydrophobic filaments, while the other filaments in each filament bundle are the metal filaments, more preferably the metal filaments are uniformly distributed among the oleophilic and hydrophobic filaments, preferably the ratio of the quantity of the oleophilic and hydrophobic filaments to the quantity of the metal filaments is (1-1,000):1, more preferably the ratio of the quantity of the oleophilic and hydrophobic filaments to the quantity of the metal filaments is (1-100):1.

In a second aspect, the present disclosure provides a washing and desalting method for an oil-water mixture, which comprises: driving the oil-water mixture to flow over the surfaces of the filaments, so that the oil phase and the water phase stretch into films on the surfaces of the filaments, wherein preferably the retention time of the oil-water mixture on the filaments is 0.5 min.-5 min., more preferably the retention time of the oil-water mixture on the filaments is 1 min.-3 min.

The washing and desalting method for an oil-water mixture according to the embodiments of the present disclosure has advantages including high salt removal efficiency, complete salt removal, low energy consumption, small amount of injected water, and short retention time.

Preferably, the weight percentage of the water phase in the oil-water mixture is 1 wt %-20 wt %, preferably the weight percentage of the water phase in the oil-water mixture is 5 wt %-15 wt %.

Preferably, the volumetric space velocity of the oil-water mixture is 5 $h^{-1}$-50 $h^{-1}$, preferably the volumetric space velocity of the oil-water mixture is 10 $h^{-1}$-30 $h^{-1}$, more preferably the volumetric space velocity of the oil-water mixture is 20 $h^{-1}$-25 $h^{-1}$.

Preferably, the temperature of the oil-water mixture is 5° C.-200° C., preferably the temperature of the oil-water mixture is 50° C.-150° C., more preferably the temperature of the oil-water mixture is 70° C.-120° C.

Preferably, the pressure of the oil-water mixture is 0.05 MPaG-2 MPaG, preferably the pressure of the oil-water mixture is 0.1 MPaG-0.5 MPaG, more preferably the pressure of the oil-water mixture is 0.2 MPaG-0.3 MPaG.

In a third aspect, the present disclosure provides a desalting and dehydrating system, which comprises: the washing and desalting device according to the first aspect of the present disclosure; and a separating device, comprising: a third shell, which has a third receiving cavity and is provided with a liquid inlet, a light phase outlet and a heavy phase outlet that communicate with the third receiving cavity, wherein the liquid inlet of the third shell communicates with the liquid outlet of the first shell; and a separating module comprising a fiber braided layer woven from oleophilic and hydrophobic filaments and hydrophilic and oleophobic filaments that are arranged in an intersecting manner to form intersections, and the separating module is arranged in the third receiving cavity.

The desalting and dehydrating system according to the embodiments of the present disclosure has advantages including high salt removal efficiency, complete salt removal, low energy consumption, small amount of injected water, short retention time, complete oil-water separation, and high oil-water separation speed.

Preferably, a plurality of fiber braided layers are provided and stacked together, and preferably every two adjacent fiber braided layers contact with each other.

Preferably, the oleophilic and hydrophobic filaments are made of at least one of polyester, polyethylene, polypropylene, polyvinyl chloride, polytetrafluoroethylene, acrylics, nylon, and materials subjected to oleophilic and hydrophobic treatment on the surface, and the hydrophilic and oleophobic filaments are made of natural macromolecular polymers with carboxyl, amino or hydroxyl groups on the main chain or side chains or materials subjected to hydrophilic and oleophobic treatment on the surface, preferably the oleophilic and hydrophobic filaments are polyester filaments, and the hydrophilic and oleophobic filaments are polypropylene filaments.

Preferably, the oleophilic and hydrophobic filaments and the hydrophilic and oleophobic filaments are woven in an X-pattern, V-pattern, splay pattern, Ω-pattern, water-drop pattern, or diamond pattern, preferably the fiber braided layer has concave-convex structures.

Preferably, the ratio of the quantity of the oleophilic and hydrophobic filaments to the quantity of the hydrophilic and oleophobic filaments is (0.1-10):1, preferably the ratio of the quantity of the oleophilic and hydrophobic filaments to the quantity of the hydrophilic and oleophobic filaments is (0.5-5):1, more preferably the ratio of the quantity of the oleophilic and hydrophobic filaments to the quantity of the hydrophilic and oleophobic filaments is 1:1.

Preferably, the desalting and dehydrating system further comprises a liquid distributor that is disposed upstream of the separating module and comprises a plurality of orifice plates stacked together.

Preferably, the third receiving cavity has a static separating cavity disposed downstream of the separating module.

Preferably, the desalting and dehydrating system further comprises a plurality of perforated corrugated plates that are disposed downstream of the separating module and arranged in a spaced manner in a predetermined direction in the third receiving cavity, wherein preferably the plurality of perforated corrugated plates are arranged in a spaced manner in the horizontal direction in the third receiving cavity, and each of the perforated corrugated plates is arranged vertically, more preferably every two adjacent perforated corrugated plates are spaced apart by 3 mm-6 mm, and the pores of the perforated corrugated plates are arranged at the wave troughs of the perforated corrugated plates, preferably a plurality of pores are arranged at an even interval at each wave trough of the perforated corrugated plate, preferably the porosity of the perforated corrugated plates is 1%-20%, more preferably the porosity of the perforated corrugated plates is 8%-15%, preferably the pores are circular pores, and the diameter of the pores is 1 mm-10 mm, more preferably the diameter of the pores is 2 mm-5 mm.

In a fourth aspect, the present disclosure provides a desalting and dehydrating system, which comprises: the washing and desalting device according to the first aspect of the present disclosure; a demulsifying device, comprising: a second shell, which has a second receiving cavity and is provided with a liquid inlet and a liquid outlet that communicate with the second receiving cavity, wherein the liquid inlet of the second shell communicates with the liquid outlet of the first shell of the washing and desalting device; a demulsifying module, which is made of an oleophilic and hydrophobic material or a hydrophilic and oleophobic material, provided with through-holes, and arranged in the second receiving cavity; and a separating device, comprising: a third shell, which has a third receiving cavity and is provided with a liquid inlet, a light phase outlet and a heavy phase outlet that communicate with the third receiving cavity, wherein the liquid inlet of the third shell communicates with the liquid outlet of the second shell; and a first separating module and a second separating module, each of which comprises a fiber braided layer woven from oleophilic and hydrophobic filaments and hydrophilic and oleophobic filaments that are arranged in an intersecting manner to form intersections, wherein the first separating module and the second separating module are arranged in the third receiving cavity, and the liquid inlet of the third shell is disposed between the first separating module and the second separating module, preferably the light phase outlet is disposed above the heavy phase outlet, and the first separating module is disposed above the second separating module.

The desalting and dehydrating system according to the embodiments of the present disclosure has advantages including high salt removal efficiency, complete salt removal, low energy consumption, small amount of injected water, short retention time, good demulsifying effect, complete oil-water separation, and high oil-water separation speed.

Preferably, each of the second shell and the demulsifying module is arranged horizontally.

Preferably, at least a part of the edge of each through-hole is linear.

Preferably, the through-holes are polygonal holes, preferably the through-holes are regular polygonal holes, more preferably the through-holes are regular hexagonal holes, further preferably the side length of the regular hexagonal hole is 0.1 mm-100 mm, optimally the side length of the regular hexagonal hole is 0.5 mm-10 mm.

Preferably, the demulsifying module comprises a plurality of demulsifying parts stacked together, preferably each of the demulsifying parts is in a plate shape or sheet shape; or the plurality of demulsifying parts are connected sequentially, and the demulsifying module is formed in a wave shape, preferably the included angle between two adjacent demulsifying parts is a preset value, more preferably each of the demulsifying parts is in a plate shape or sheet shape; or each of the demulsifying parts is in a cylindrical shape, and the plurality of demulsifying parts are sleeved around each other together sequentially, preferably every two adjacent demulsifying parts contact with each other.

Preferably, the demulsifying module is curled into a spiral shape, preferably the parts of the demulsifying module in two adjacent turns contact with each other.

Preferably, the surface porosity of the demulsifying module is 50%-95%, preferably the surface porosity of the demulsifying module is 65%-85%.

Preferably, a plurality of fiber braided layers are provided and stacked together, and preferably every two adjacent fiber braided layers contact with each other.

Preferably, the oleophilic and hydrophobic filaments are made of at least one of polyester, polyethylene, polypropylene, polyvinyl chloride, polytetrafluoroethylene, acrylics, nylon, and materials subjected to oleophilic and hydrophobic treatment on the surface, and the hydrophilic and oleophobic filaments are made of natural macromolecular polymers with carboxyl, amino or hydroxyl groups on the main chain or side chains or materials subjected to hydrophilic and oleophobic treatment on the surface, preferably the oleophilic and hydrophobic filaments are polyester filaments, and the hydrophilic and oleophobic filaments are polypropylene filaments.

Preferably, the oleophilic and hydrophobic filaments and the hydrophilic and oleophobic filaments are woven in an X-pattern, V-pattern, splay pattern, Ω-pattern, water-drop pattern, or diamond pattern, preferably the fiber braided layer has concave-convex structures.

Preferably, the ratio of the quantity of the light-phase affiliative filaments to the quantity of the heavy-phase affiliative filaments in the first separating module is 1:(1-10), preferably the ratio of the quantity of the light-phase affiliative filaments to the quantity of the heavy-phase affiliative filaments in the first separating module is 1:(2-5); the ratio of the quantity of the light-phase affiliative filaments to the quantity of the heavy-phase affiliative filaments in the second separating module is (1-10):1, preferably the ratio of the quantity of the light-phase affiliative filaments to the quantity of the heavy-phase affiliative filaments in the second separating module is (2-5):1.

Preferably, the first separating module and the second separating module are spaced from each other so that a steady flow area is formed between the first separating module and the second separating module, and the liquid inlet of the separating device communicates with the steady flow area, preferably the first separating module and the second separating module are spaced from each other by a predetermined distance, more preferably the first separating module and the second separating module are spaced from each other in the vertical direction, the first separating module is disposed above the second separating module, and the liquid inlet of the separating device is opposite to and communicates with the steady flow area in the horizontal direction.

Preferably, the desalting and dehydrating system further comprises: a first liquid distributor, which is arranged in the third receiving cavity, is disposed upstream of the first separating module, and comprises a plurality of first orifice plates stacked together, preferably 5-10 first orifice plates are provided, each of the first orifice plates is arranged horizontally, the diameter of each first orifice plate is 4 mm-8 mm, and the center distance between every two adjacent holes of each first orifice plate is 20 mm-30 mm; and a second liquid distributor, which is arranged in the third receiving cavity and disposed upstream of the second separating module, wherein the liquid inlet of the third shell is disposed between the first liquid distributor and the second liquid distributor, and the second liquid distributor comprises a plurality of second orifice plates stacked together, preferably 5-10 second orifice plates are provided, each of the second orifice plates is arranged horizontally, the diameter of each second orifice plate is 4 mm-8 mm, and the center distance between every two adjacent holes of each second orifice plate is 20 mm-30 mm.

Preferably, the desalting and dehydrating system further comprises a plurality of perforated corrugated plates that are disposed downstream of the second separating module and arranged in a spaced manner in a predetermined direction in the third receiving cavity, wherein preferably the plurality of perforated corrugated plates are arranged in a spaced manner in the vertical direction in the third receiving cavity, and each of the perforated corrugated plates is arranged horizontally, more preferably every two adjacent perforated corrugated plates are spaced apart by 3 mm-6 mm, and the pores of the perforated corrugated plates are arranged at the wave troughs of the perforated corrugated plates, preferably a plurality of pores are arranged at an even interval at each wave trough of the perforated corrugated plate, preferably the porosity of the perforated corrugated plates is 1%-20%, more preferably the porosity of the perforated corrugated plates is 8%-15%, preferably the pores are circular pores, and the diameter of the pores is 1 mm-10 mm, more preferably the diameter of the pores is 2 mm-5 mm.

Preferably, the desalting and dehydrating system further comprises a mixer having a mixing cavity, wherein a light phase inlet is provided in the bottom wall surface of the mixer, a heavy phase inlet is provided in the side wall surface of the mixer, and a liquid outlet of the mixer communicates with the liquid inlet of the first shell, preferably a disturbing member is provided in the mixing cavity, and the disturbing member comprises at least one of SWN-type plates, SMX-type plates, SMK-type plates, SML-type plates, SMH-type plates, spiral plates, corrugated plates, rotating blades, flat blades, curved blades, perforated plates, and swirling assembly, more preferably, a plurality of mixers are provided, the mixing cavities of the plurality of mixers are connected in series sequentially, the heavy phase inlet is provided in the side wall surface of the first mixing cavity, the light phase inlet is provided in the bottom wall surface of each mixing cavity, and an liquid outlet of the last mixer communicates with the liquid inlet of the first shell of the washing and desalting device.

In a fifth aspect, the present disclosure provides a desalting and dehydrating method for an oil-water mixture using the desalting and dehydrating system according to the third aspect of the present disclosure, which comprises the following steps: performing washing and desalting for the oil-water mixture with the washing and desalting method for an oil-water mixture according to the second aspect of the present disclosure; and performing separation of the oil-water mixture with the separating device of the desalting and dehydrating system, so as to obtain an oil phase and a water phase, preferably the temperature of the oil-water mixture entering the separating device is 5° C.-200° C., more preferably the temperature of the oil-water mixture entering the separating device is 50° C.-150° C., preferably the pressure of the oil-water mixture entering the separating device is 0.1 MPaG-2 MPaG, more preferably the pressure of the oil-water mixture entering the separating device is 0.5 MPaG-1.5 MPaG, preferably the retention time of the oil phase of the oil-water mixture in the separating device is 0.5 min.-10 min., more preferably the retention time of the oil phase of the oil-water mixture in the separating device is 1 min.-5 min.

The desalting and dehydrating method for an oil-water mixture according to the embodiments of the present disclosure has advantages including high salt removal efficiency, complete salt removal, low energy consumption, small amount of injected water, short retention time, complete oil-water separation, and high oil-water separation speed.

In a sixth aspect, the present disclosure provides a desalting and dehydrating method for an oil-water mixture using the desalting and dehydrating system according to the fourth aspect of the present disclosure, which comprises the following steps: performing washing and desalting for the oil-water mixture with the washing and desalting method for an oil-water mixture according to the second aspect of the present disclosure; driving the oil-water mixture to flow through the through-holes in the demulsifying module of the demulsifying device of the desalting and dehydrating system, so as to obtain a heavy phase and a light phase; and driving the heavy phase to flow through one of the first separating module and the second separating module of the separating device of the desalting and dehydrating system, and driving the light phase to flow through the other of the first separating module and the second separating module, so as to obtain an oil phase and a water phase, preferably the temperature of the oil-water mixture entering the demulsifying device is 5° C.-200° C., more preferably the temperature of the oil-water mixture entering the demulsifying device is 50° C.-150° C., preferably the temperature of the heavy phase is 5° C.-200° C., and the temperature of the light phase is 5° C.-200° C., more preferably the temperature of the heavy phase is 50° C.-150° C., and the temperature of the light phase is 50° C.-150° C., preferably the pressure of the heavy phase is 0.1 MPaG-2 MPaG, and the pressure of the light phase is 0.1 MPaG-2 MPaG, more preferably the pressure of the heavy phase is 0.5 MPaG-1.5 MPaG, and the pressure of the light phase is 0.5 MPaG-1.5 MPaG, preferably the retention time of the oil-water mixture in the demulsifying device is 0.5 min.-5 min., more preferably the retention time of the oil-water mixture in the demulsifying device is 0.5 min.-3 min., preferably the retention time of the oil phase of the oil-water mixture in the separating device is 0.5 min.-10 min., more preferably the retention time of the oil phase of the oil-water mixture in the separating device is 1 min.-5 min.

The desalting and dehydrating method for an oil-water mixture according to the embodiments of the present disclosure has advantages including high salt removal efficiency, complete salt removal, low energy consumption, small amount of injected water, short retention time, good demulsifying effect, complete oil-water separation, and high oil-water separation speed.

DETAILED DESCRIPTION OF THE EMBODIMENTS

Hereunder some embodiments of the present disclosure will be detailed, and examples of the embodiments are shown in the accompanying drawings. It should be noted that the embodiments described with reference to the accompanying drawings are only exemplary and are provided only to explain the present disclosure rather than constitute any limitation to the present disclosure.

Figure 1:
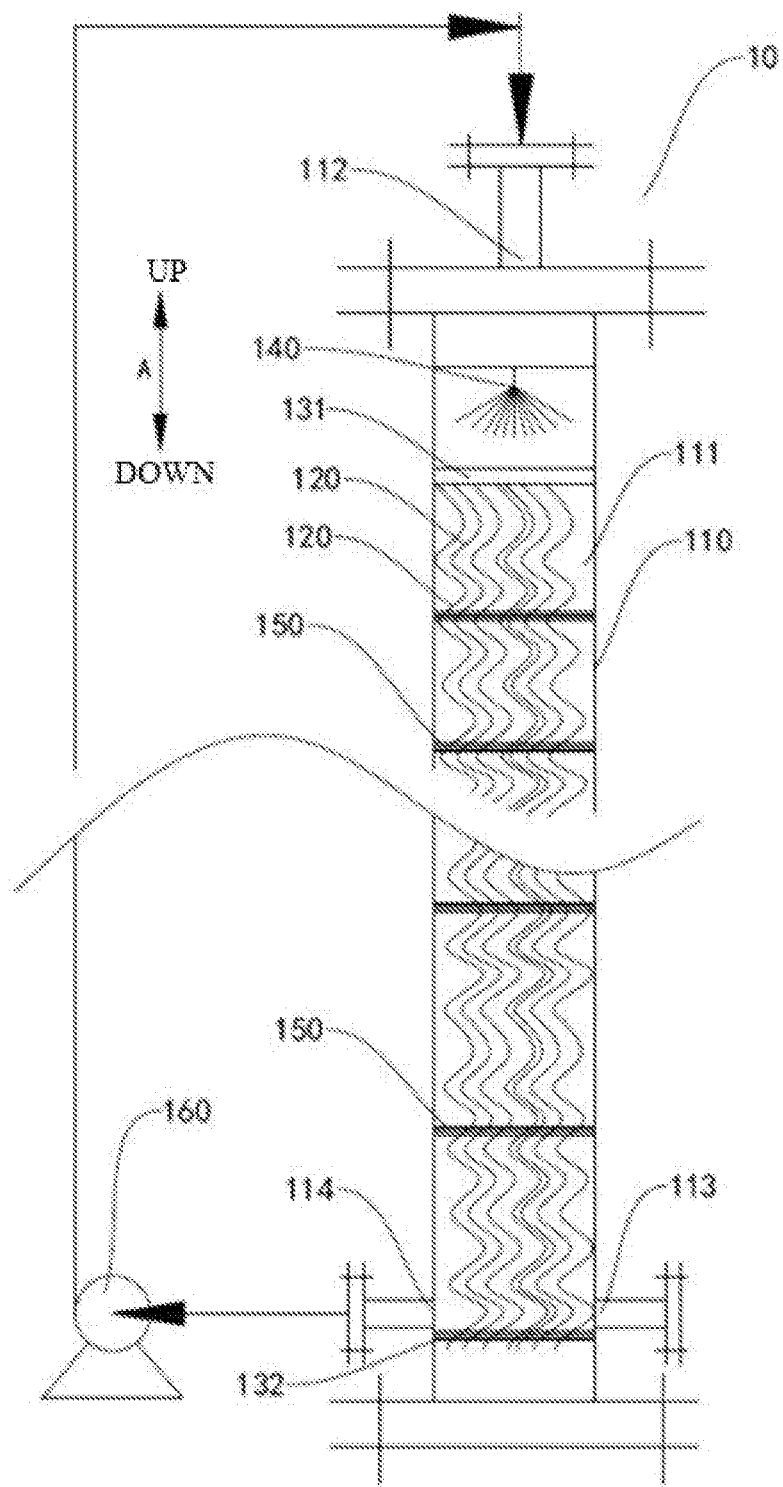
FIG. 1 is a schematic structural diagram of the washing and desalting device according to the embodiments of the present disclosure.
Figure 3:
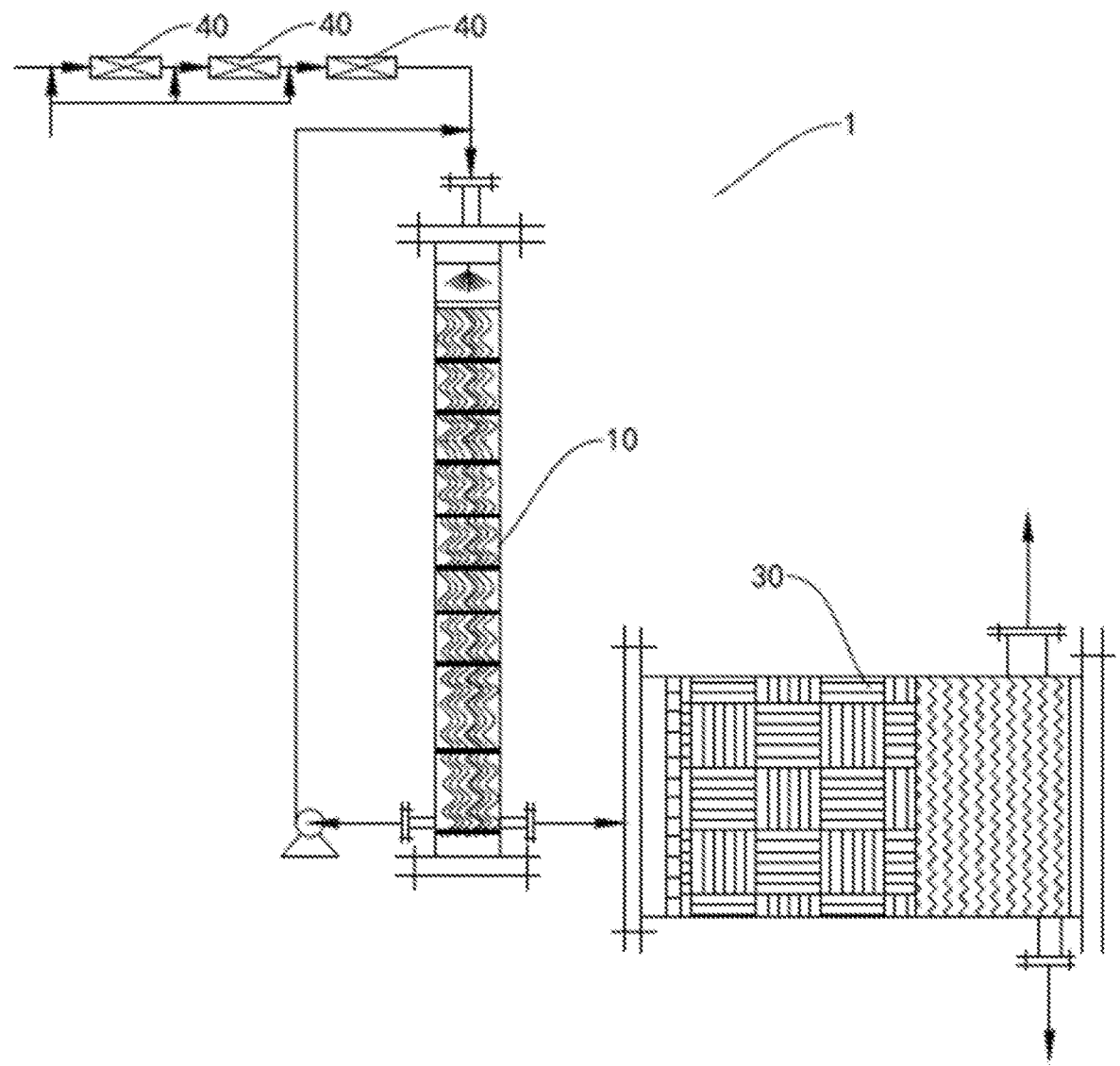
FIG. 3 is a schematic structural diagram of the desalting and dehydrating system according to an embodiment of the present disclosure.
Figure 6:
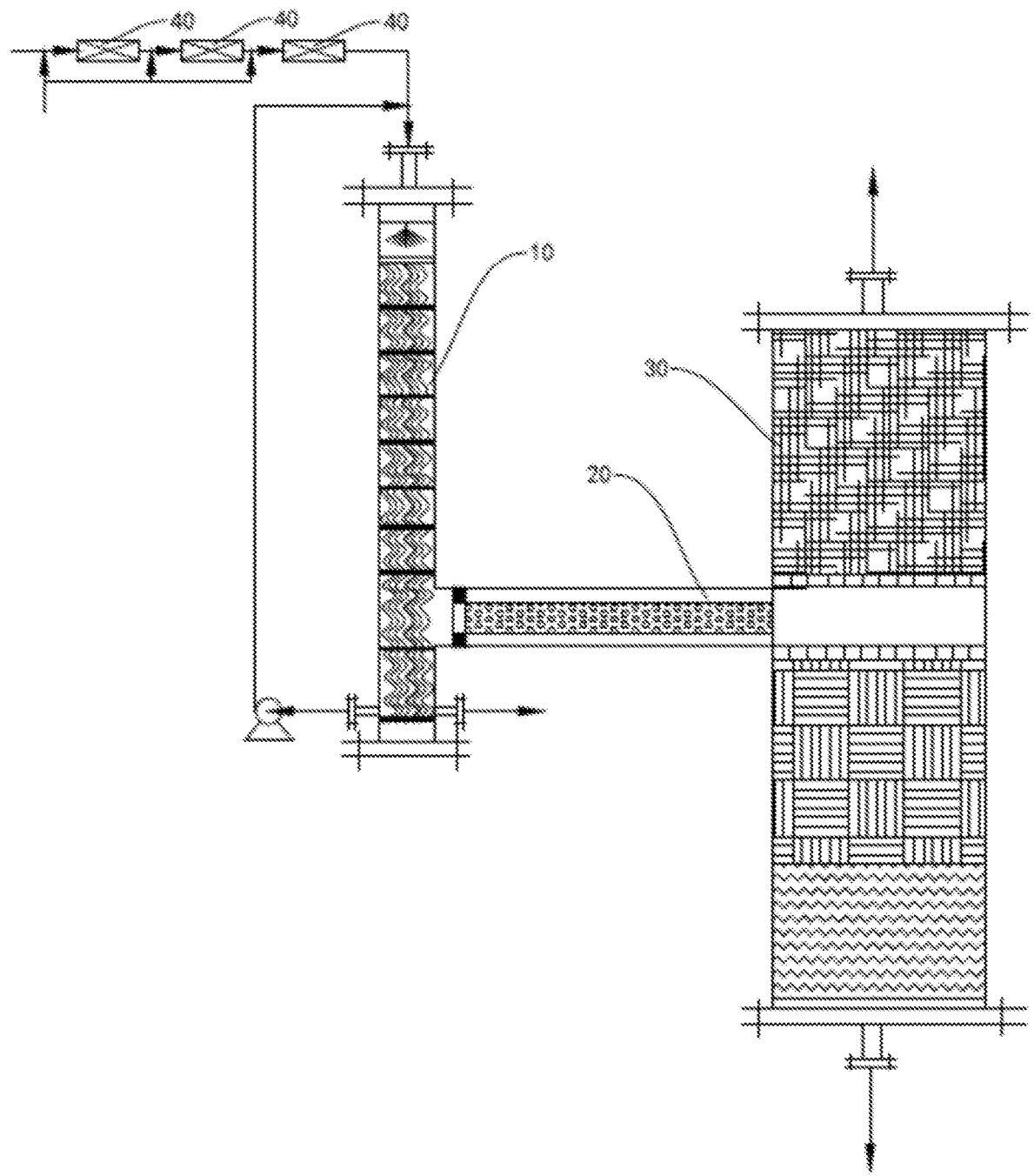
FIG. 6 is a schematic structural diagram of the desalting and dehydrating system according to another embodiment of the present disclosure.

Hereunder the embodiments of the present disclosure will be described with reference to the accompanying drawings. As shown in FIGS. 1, 3 and 6, the washing and desalting device 10 according to the embodiments of the present disclosure comprises a first shell 110 and a plurality of filaments 120. The first shell 110 has a first receiving cavity 111, and is provided with a liquid inlet 112 and a liquid outlet 113 that communicate with the first receiving cavity 111. The plurality of filaments 120 are provided in the first receiving cavity 111.

An oil-water mixture can enter the first receiving cavity 111 through the liquid inlet 112, and the oil-water mixture in the first receiving cavity 111 can flow over the surfaces of the filaments 120, so that the oil-water mixture can contact with the surfaces of the filaments 120.

Specifically, when the oil-water mixture flows over the surfaces of the filaments 120, the oil phase and water phase can stretch into films on the surfaces of the filaments 120 under a capillary action owing to the difference in tension between the water phase and the oil phase on the surfaces of the filaments 120. Since the plurality of filaments 120 have great surface area, they can provide great surface area for mass transfer of the oil phase and water phase to enhance the mass transfer effect (each filament 120 can provide an unit of mass transfer surface), so that the salts in the oil phase are intensively dissolved in the water phase, and thereby the washing and desalting efficiency and washing and desalting rate are greatly improved, and deep removal of the salts in the oil phase can be realized.

In the washing and desalting device 10 according to the embodiments of the present disclosure, by providing a plurality of filaments 120, the oil phase and the water phase can stretch into films on the surfaces of the filaments 120, thus great surface area can be provided for mass transfer between the oil phase and the water phase to enhance mass transfer, i.e., the area of mass transfer between the oil phase and the water phase is greatly increased, so that the salts in the oil phase can be intensively dissolved in the water phase, and thereby the washing and desalting efficiency and washing and desalting rate are greatly improved, and deep removal of the salts in the oil phase can be realized.

Since the washing and desalting device 10 according to the embodiments of the present disclosure can greatly increase the area of mass transfer between the oil phase and the water phase, the slats in the oil phase can be removed without increasing the amount of injected water. Thus, the amount of injected water can be reduced greatly.

Moreover, compared with the electrodesalting technique (often four-stage or five-stage electrodesalting) in the prior art, the washing and desalting device 10 according to the embodiments of the present disclosure has a simple structure, and doesn't consume electric power.

Therefore, the washing and desalting device 10 according to the embodiments of the present disclosure has advantages including high desalting efficiency, complete desalting, low energy consumption, small amount of injected water, short retention time, and simple structure, etc.

After treated by washing and desalting with the washing and desalting device 10 according to the embodiments of the present disclosure, the salt content in the crude oil may be lower than 3 mg/L.

The washing and desalting device 10 according to the embodiments of the present disclosure not only is suitable for washing and desalting of crude oil with high salt content, but also is applicable to washing and desalting of various oil products such as inferior crude oil, heavy oil, coal tar, oil sand asphalt, and heavy sump oil, etc., owing to the following reason: inferior crude oil, heavy crude oil, coal tar, oil sand asphalt, heavy sump oil and other similar oil products have high viscosity and high density. It is difficult to make these oil products contact with water dispersedly and mixed with water homogeneously. If a known electrodesalting device is used, the salts in these crude oils can't be removed to content lower than 3 mg/L to meet the technical specification, even if a large amount of water is injected and a long retention time is used.

In addition, the washing and desalting device 10 according to the embodiments of the present disclosure is also applicable to washing and desalting of common light crude oils.

As shown in FIGS. 1-15, in some embodiments of the present disclosure, the desalting and dehydrating system 1 may comprise a washing and desalting device 10, a demulsifying device 20, and a separating device 30. The desalting and dehydrating system 1 can perform deep desalting and dehydration for various inferior crude oil, heavy oil, coal tar, oil sand asphalt, heavy sump oil and other similar oil products.

The washing and desalting device 10 may comprise a first shell 110 and a plurality of filaments 120. The first shell 110 may have a first receiving cavity 111, and may be provided with a liquid inlet 112 and a liquid outlet 113 that communicate with the first receiving cavity 111. The oil-water mixture can enter the first receiving cavity 111 through the liquid inlet 112, and can leave the first receiving cavity 111 through the liquid outlet 113.

A plurality of filaments 120 may be provided in the first receiving cavity 111, and the length direction of each filament 120 may be consistent with the length direction of the first receiving cavity 111. The length direction of the first receiving cavity 111 may be consistent with the length direction of the first shell 110. For example, the length direction of the first shell 110, the length direction of the first receiving cavity 111, and the length direction of the filaments 120 may be consistent with the vertical direction, i.e., each of the first shell 110, the first receiving cavity 111 and the filaments 120 can extend in the vertical direction. The vertical direction is shown by the arrow A in FIG. 1.

The oil-water mixture can enter the first receiving cavity 111 through the liquid inlet 112, and the oil-water mixture in the first receiving cavity 111 can flow over the surfaces of the filaments 120, so that the oil-water mixture can contact with the surfaces of the filaments 120.

Specifically, when the oil-water mixture flows over the surfaces of the filaments 120, the oil phase and water phase can stretch into films on the surfaces of the filaments 120 under a capillary action owing to the difference in tension between the water phase and the oil phase on the surfaces of the filaments 120. Since the plurality of filaments 120 have great surface area, they can provide great surface area for mass transfer of the oil phase and water phase to enhance the mass transfer effect (each filament 120 can provide an unit of mass transfer surface), so that the salts in the oil phase are intensively dissolved in the water phase, and thereby the washing and desalting efficiency and washing and desalting rate are greatly improved, and deep removal of the salts in the oil phase can be realized.

In the washing and desalting device 10 according to the embodiments of the present disclosure, by providing a plurality of filaments 120, the oil phase and the water phase can stretch into films on the surfaces of the filaments 120, thus great surface area can be provided for mass transfer between the oil phase and the water phase to enhance mass transfer, i.e., the area of mass transfer between the oil phase and the water phase is greatly increased, so that the salts in the oil phase can be intensively dissolved in the water phase, and thereby the washing and desalting efficiency is greatly improved, and deep removal of the salts in the oil phase can be realized.

Moreover, compared with the electrodesalting technique (often four-stage or five-stage electrodesalting) in the prior art, the washing and desalting device 10 according to the embodiments of the present disclosure has a simple structure, and doesn't consume electric power.

Therefore, the washing and desalting device 10 according to the embodiments of the present disclosure has advantages including high desalting efficiency, complete desalting, low energy consumption, and simple structure, etc.

After treated by washing and desalting with the washing and desalting device 10 according to the embodiments of the present disclosure, the salt content in the crude oil may be lower than 3 mg/L.

The washing and desalting device 10 according to the embodiments of the present disclosure not only is suitable for washing and desalting of crude oil or oil products with high salt content, but also is applicable to washing and desalting of various oil products such as inferior crude oil, heavy oil, coal tar, oil sand asphalt, and heavy sump oil, etc., owing to the following reason: inferior crude oil, heavy oil, coal tar, oil sand asphalt, heavy sump oil and other similar oil products have high viscosity and high density. It is difficult to make these oil products contact with water dispersedly and mixed with water homogeneously. If a known electrodesalting device is used, the salts in these crude oils can't be removed to content lower than 3 mg/L to meet the technical specification, even if a large amount of water is injected and a long retention time is used.

Each filament 120 may be an oleophilic and hydrophobic filament. Alternatively, some of the plurality of filaments 120 may be oleophilic and hydrophobic filaments, while the others of the plurality of filaments 120 may be metal filaments, i.e., the filaments 120 may be composite filaments composed of oleophilic and hydrophobic filaments and metal filaments. Since the metal filaments have certain hydrophilicity, the area of mass transfer between the oil phase and the water phase can be further increased, so that the oil phase and the water phase can contact with each other better, and the salts in the oil phase can be more fully dissolved in the water phase. Thus, the washing and desalting efficiency is greatly improved, and deep removal of the salts in the oil phase is realized.

Preferably, the ratio of the quantity of the oleophilic and hydrophobic filaments to the quantity of the metal filaments may be (1-1,000):1. More preferably, the ratio of the quantity of the oleophilic and hydrophobic filaments to the quantity of the metal filaments may be (1-100):1.

Wherein the oleophilic and hydrophobic filaments may be selected from at least one of polyester filaments, nylon filaments, polyurethane filaments, polypropylene filaments, polyacrylonitrile filaments, and polyvinyl chloride filaments, and the metal filaments may be stainless steel filaments.

The plurality of filaments 120 may form a plurality of filament bundles, some filaments in each filament bundle may be oleophilic and hydrophobic filaments, while the other filaments in each filament bundle may be metal filaments. Preferably, the metal filaments may be uniformly distributed among the oleophilic and hydrophobic filaments, or the oleophilic and hydrophobic filaments may be uniformly distributed among the metal filaments.

Preferably, the filling density of the plurality of filaments 120 may be 1%-9%. Wherein the filling density of the plurality of filaments 120 refers to a ratio of the sum (total) of the sectional areas (cross-sectional areas) of all the filaments 120 to the sectional area (cross-sectional area) of the first receiving cavity 111. More preferably, the filling density of the plurality of filaments 120 may be 3%-5%. If the filling density of the plurality of filaments 120 is excessively high, the flow resistance of the oil-water mixture will be too great, and the flow speed of the oil-water mixture will be too low. Consequently, the oil-water mixture may be stagnated or even blocked, and a flow dead zone may be formed easily, resulting adverse effects to the mass transfer between the two phases. If the filling density of the plurality of filaments 120 is too low, the flow resistance of the oil-water mixture will be too small, and the flow speed of the oil-water mixture will be too fast. Consequently, a ditch flow zone may be formed easily, and the mass transfer between the two phases will be impossible in the ditch flow zone, since there is no phase interface in the ditch flow zone.

The cross section of the first receiving cavity 111 may be circular, and the ratio of the length of the first receiving cavity 111 to the diameter of the cross section of the first receiving cavity 111 (length-to-diameter ratio or height-to-diameter ratio) may be (10-100):1. Preferably, the ratio of the length of the first receiving cavity 111 to the diameter of the cross section of the first receiving cavity 111 may be (30-70):1. More preferably, the ratio of the length of the first receiving cavity 111 to the diameter of the cross section of the first receiving cavity 111 may be (40-50):1. Optimally, the ratio of the length of the first receiving cavity 111 to the diameter of the cross section of the first receiving cavity 111 may be 45:1. The ratio of the length of the first receiving cavity 111 to the diameter of the cross section of the first receiving cavity 111 may be determined according to the flow speed and retention time of the oil-water mixture.

As shown in FIGS. 1, 3 and 6, each of the filaments 120 may be configured in a serpentine shape. In other words, each filament 120 may be configured in a corrugated shape. Thus, the length of the filament 120 (the length after the serpentine filament 120 is straightened) can be greater than the length of the first receiving cavity 111, so that the surface area of the filaments 120 can be further increased, i.e., the length (e.g., height) of the first receiving cavity 111 and the length of the first shell 110 can be reduced while the area of mass transfer between the oil phase and the water phase is further increased, so as to reduce the space occupied by the washing and desalting device 10.

The washing and desalting device 10 may further comprise a first mounting member 131 and a second mounting member 132, which may be arranged in a spaced manner on the wall surface of the first receiving cavity 111 in the length direction of the first receiving cavity 111. The first end of each filament 120 may be connected with the first mounting member 131, and the second end of each filament 120 may be connected with the second mounting member 132. Thus the filaments 120 can be more conveniently and stably mounted in the first receiving cavity 111.

Both the first mounting member 131 and the second mounting member 132 may be mounting plates, and may be welded to the wall surface of the first receiving cavity 111.

As shown in FIGS. 1, 3 and 6, the first end of each filament 120 may be adjacent to the liquid inlet 112 of the first receiving cavity 111 in the length direction of the first receiving cavity 111, and the second end of each filament 120 may be adjacent to the liquid outlet 113 of the first receiving cavity 111 in the length direction of the first receiving cavity 111. For example, the first mounting member 131 may be adjacent to the liquid inlet 112 of the first receiving cavity 111 in the length direction of the first receiving cavity 111, and the second mounting member 132 may be adjacent to the liquid outlet 113 of the first receiving cavity 111 in the length direction of the first receiving cavity 111.

Thus the space of the first receiving cavity 111 can be utilized more fully, and thereby the length of the first receiving cavity 111 and the length of the first shell 110 can be reduced, so as to reduce the space occupied by the washing and desalting device 10.

The washing and desalting device 10 may further comprise a first material distributor 140, which may be arranged in the first receiving cavity 111, and may be disposed between the liquid inlet 112 of the first receiving cavity 111 and the first end of the filaments 120 in the length direction of the first receiving cavity. For example, the first material distributor 140 may be disposed below the liquid inlet 112 of the first receiving cavity 111, and the first end of the filaments 120 may be disposed below the first material distributor 140.

The liquid inlet of the first material distributor 140 may communicate with the liquid inlet 112 of the first receiving cavity 111. Thus, the oil-water mixture entering the first receiving cavity 111 through the liquid inlet 112 can enter the first material distributor 140, and thereby the first material distributor 140 can initially distribute the oil-water mixture well, so that the oil-water mixture can be distributed more uniformly on the plurality of filaments 120, and thereby the mass transfer efficiency can be improved, i.e., the salts in the oil phase can be dissolved more quickly in the water phase.

The first material distributor 140 may be of a shower head type, tube type, branch type, or tank type. As shown in FIGS. 1, 3 and 6, the washing and desalting device 10 may further comprise a limiting member 150, which may be arranged on the wall surface of the first receiving cavity 111. The limiting member 150 may comprise a first limiting part and a second limiting part (not shown in the figures), which may be spaced apart in a first direction that may be perpendicular to the length direction of the first receiving cavity 111. For example, in the case that the length direction of the first receiving cavity 111 is the vertical direction, the first direction may be the horizontal direction. Each filament 120 may be disposed between the first limiting part and the second limiting part in the first direction. Thus the filaments 120 can be limited (stopped) with the first limiting part and the second limiting part, and thereby the filaments 120 can be prevented from swinging under the action of the oil-water mixture in the first direction. If the filaments 120 swing (float) freely in the first receiving cavity 111, they not only disturb the flow of the oil-water mixture, but also may be entangled easily.

Preferably a plurality of limiting members 150 may be provided, and the plurality of limiting members 150 may be arranged in a spaced manner in the length direction of the first receiving cavity 111. Thus the filaments 120 can be limited better, and thereby the filaments 120 can be prevented from swing under the action of the oil-water mixture in the first direction.

As shown in FIGS. 1, 3 and 6, in some embodiments of the present disclosure, the first shell 110 may be provided with a circulating liquid outlet 114 communicating with the first receiving cavity 111, and the washing and desalting device 10 may further comprise a circulating pump 160, the liquid inlet of the circulating pump 160 may communicate with the circulating liquid outlet 114, and the liquid outlet of the circulating pump 160 may communicate with the liquid inlet 112 of the first shell 110.

Thus at least a part of the oil-water mixture in the first receiving cavity 111 can be extracted with the circulating pump 160 and then fed into the first receiving cavity 111 again through the liquid inlet 112, so that the part of oil-water mixture flows over the filaments 120 again, thereby performs mass transfer again, and thus the washing and desalting efficiency can be further improved.

At least a part of the oil-water mixture in the first receiving cavity 111 may be recirculated repeatedly as required so as to perform mass transfer repeatedly. The larger the quantity of the filaments 120 is, the larger the surface area is, and the fewer the number of cycles and the amount of circulation of the oil-water mixture can be.

As shown in FIGS. 1, 3 and 6, the circulating liquid outlet 114 may opposite to the liquid outlet 113 of the first shell 110 in the first direction, and thereby the structure of the washing and desalting device 10 is more reasonable.

The oil-water mixture entering the first receiving cavity 111 may be formed by mixing water and crude oil. As shown in FIGS. 3 and 6, the desalting and dehydrating system 1 may further comprise a mixer 40, so as to utilize the mixer 40 to mix water and crude oil and obtain the oil-water mixture.

The mixer 40 may have a mixing cavity, a light phase inlet may be arranged in the bottom wall surface of the mixer 40, and a heavy phase inlet may be arranged in the side wall surface of the mixer 40. Usually crude oil is the light phase, while water is the heavy phase; if the crude oil is heavy crude oil, the crude oil is the heavy phase, while water is the light phase. The liquid outlet of the mixer 40 may communicate with the liquid inlet 112 of the first shell 110.

Preferably a disturbing member (not shown in the figures) may be provided in the mixing cavity of the mixer 40, and the disturbing member may comprise at least one of SWN-type plates, SMX-type plates, SMK-type plates, SML-type plates, SMH-type plates, spiral plates, corrugated plates, rotating blades, flat blades, curved blades, perforated plates, and swirling assembly. Under the repeated action of the shearing force of the disturbing member on the oil phase and the water phase, the laminar flow velocity gradient of the fluid is increased or turbulence is formed in the fluid, or even turbulent swirling flow is produced, so that the fluid is continuously divided, mixed, and finally mixed to a homogeneous state.

As shown in FIGS. 3 and 6, a plurality of mixers 40 may be provided, each mixer 40 may have a mixing cavity, the plurality of mixing cavities may be connected in series sequentially, the heavy phase inlet may be provided in the side wall surface of the first mixing cavity, and the light phase inlet may be provided in the bottom wall surface of each mixing cavity. The liquid outlet of the last mixer 40 may communicate with the liquid inlet 112 of the first shell 110.

The heavy phase may enter the first mixing cavity through the heavy phase inlet, and the light phase may enter the first mixing cavity through the light phase inlet. The heavy phase and the light phase are mixed in the first mixing cavity to obtain an oil-water mixture, and then the oil-water mixture enters the second mixing cavity, and is mixed with the light phase entering the second mixing cavity through the light phase inlet. That pattern is repeated, till the oil-water mixture in the last mixing cavity enters the washing and desalting device 10.

The weight percentage of the water phase in the oil-water mixture leaving the mixer 40 (i.e., the oil-water mixture entering the first receiving cavity 111) may be 1 wt %-20 wt %. Thus, the salts in the oil phase can be dissolved fully in the water phase, and increased difficulty in the oil-water separation incurred by excessive water phase can be prevented. Preferably, the weight percentage of the water phase in the oil-water mixture may be 5 wt %-15 wt %. Thus, the salts in the oil phase can be dissolved more fully in the water phase, and increased difficulty in the oil-water separation incurred by excessive water phase can be prevented.

If the temperature of the oil-water mixture entering the first receiving cavity 111 is too low, the viscosity of the oil-water mixture will be very high and adverse to the spreading of the oil phase and the water phase on the surfaces of the filaments 120; if the temperature of the oil-water mixture entering the first receiving cavity 111 is too high, the water will tend to vaporize, which is adverse to the mass transfer between the oil phase and the water phase.

The temperature of the oil-water mixture entering the first receiving cavity 111 is 5° C.-200° C., i.e., the temperature of the oil-water mixture entering the first receiving cavity 111 may be greater than or equal to 5° C. and smaller than or equal to 200° C. That temperature range not only facilitates the spreading of the oil phase and the water phase on the surfaces of the filaments 120, but also enhances the mass transfer between the oil phase and the water phase, i.e., the salts in the oil phase can be dissolved more quickly in the water phase.

Preferably, the temperature of the oil-water mixture entering the first receiving cavity 111 may be greater than or equal to 50° C. and smaller than or equal to 150° C. That temperature range not only facilitates the spreading of the oil phase and the water phase on the surfaces of the filaments 120 and enhances the mass transfer between the oil phase and the water phase, but also is helpful for reducing energy consumption.

More preferably, the temperature of the oil-water mixture entering the first receiving cavity 111 may be greater than or equal to 70° C. and smaller than or equal to 120° C. Even more preferably, the temperature of the oil-water mixture entering the first receiving cavity 111 may be greater than or equal to 80° C. and smaller than or equal to 100° C. That temperature range not only facilitates the spreading of the oil phase and the water phase on the surfaces of the filaments 120 and enhances the mass transfer between the oil phase and the water phase, but also is helpful for reducing energy consumption.

The retention time of the oil-water mixture on the filaments 120 may be 0.5 min.-5 min., i.e., the retention time of the oil-water mixture in the washing and desalting device 10 (the first receiving cavity 111) may be 0.5 min.-5 min. Preferably, the retention time of the oil-water mixture on the filaments 120 may be 1 min.-3 min. More preferably, the retention time of the oil-water mixture on the filaments 120 may be 2 min.

The volumetric space velocity of the oil-water mixture entering the first receiving cavity 111 may be 5 $h^{-1}$-50 $h^{-1}$. Preferably, the volumetric space velocity of the oil-water mixture entering the first receiving cavity 111 may be 10 $h^{-1}$-30 $h^{-1}$. More preferably, the volumetric space velocity of the oil-water mixture entering the first receiving cavity 111 may be 20 $h^{-1}$-25 $h^{-1}$. If the volumetric space velocity of the oil-water mixture is too high, the liquid film formed by the oil-water mixture on the surfaces of the filaments 120 will be very thick, resulting in reduced mass transfer area and decreased mass transfer rate; if the volumetric space velocity of the oil-water mixture is too low, the throughput and yield of the washing and desalting device 10 will be too low.

The pressure of the oil-water mixture entering the first receiving cavity 111 may be 0.05 MPaG-2 MPaG. Preferably, the pressure of the oil-water mixture entering the first receiving cavity 111 may be 0.1 MPaG-0.5 MPaG. More preferably, the pressure of the oil-water mixture entering the first receiving cavity 111 may be 0.2 MPaG-0.3 MPaG. Thus, the oil-water mixture can flow over the surfaces the filaments 120 smoothly and spread into a film on the surfaces of the filaments 120, and the energy consumption can be reduced.

If the oil-water mixture is obtained by mixing inferior crude oil, heavy crude oil, coal tar, or oil sand asphalt, etc. with water, then after the oil-water mixture flows through the washing and desalting device 10, the oil phase and the water phase are mixed very uniformly, and a highly emulsified water-in-oil type oil-water mixture is formed. The oil-water mixture leaving the washing and desalting device 10 may be fed into the demulsifying device 20 first for demulsification.

Figure 4:
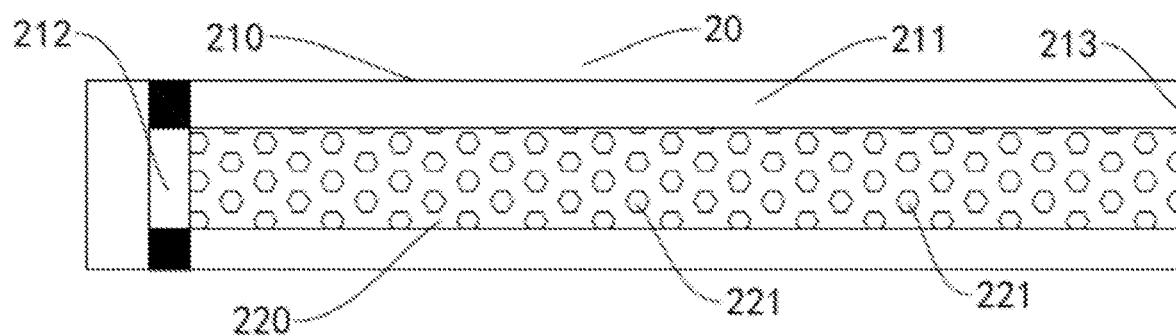
FIG. 4 is a schematic structural diagram of the demulsifying device according to the embodiments of the present disclosure.

As shown in FIG. 4, the demulsifying device 20 may comprise a second shell 210 and a demulsifying module 220. The second shell 210 may have a second receiving cavity 211, and may be provided with a liquid inlet 212 and a liquid outlet 213 that communicate with the second receiving cavity 211. The liquid inlet 212 of the second shell 210 may communicates with the liquid outlet 113 of the first shell 110 of the washing and desalting device 10. The demulsifying module 220 may be made of an oleophilic and hydrophobic material or a hydrophilic and oleophobic material, provided with through-holes 221, and arranged in the second receiving cavity 211.

The oil-water mixture entering the second receiving cavity 211 can flow through the through-holes 221 of the demulsifying module 220. The edges of the through-holes 221 can cut the water-in-oil emulsified liquid droplets to break the water-in-oil structure, so that the small water droplets wrapped by the oil phase can be released, and can coalesce to form greater water droplets and then settle down (or float up).

By arranging through-holes 221 in the demulsifying device 20 according to the embodiments of the present disclosure, the water-in-oil structure can be cut by the edges of the through-holes 221, and thereby the water droplets wrapped by the oil phase can be released, so that the water droplets coalesce to form greater water droplets.

That is to say, the oil-water mixture entering the second receiving cavity 211 can pass through the through-holes 221 of the demulsifying module 220, so that the water-in-oil emulsified droplets are cut and thereby demulsification is completed and the water droplets are released in that process, then the water droplets can coalesce into greater water droplets and settle down.

The demulsifying module 220 may comprise a plurality of demulsifying parts 222. Thus, the water-in-oil emulsified small liquid droplets can be cut repeatedly, and thereby more water droplets wrapped by the oil phase can be released, and oil-water separation can be completed more effectively and fully.

In a first example of the present disclosure, a plurality of demulsifying parts 222 may be stacked together. For example, each demulsifying part 222 may be arranged vertically, and the plurality of demulsifying parts 222 may be aligned in the horizontal direction. Every two adjacent demulsifying parts 222 may or may not contact with each other. Preferably, each of the demulsifying parts 222 may be in a sheet shape or plate shape.

Figure 15:
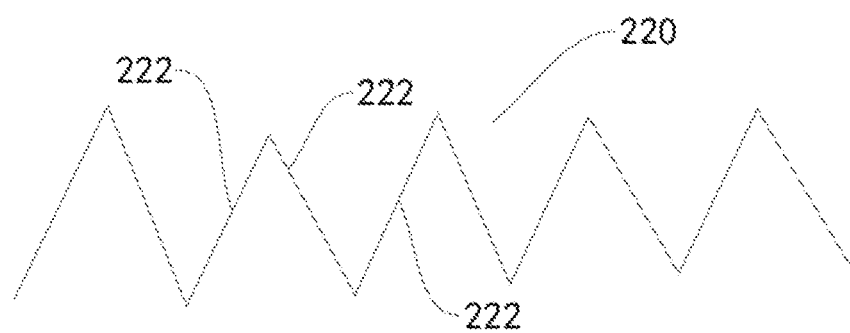
FIG. 15 is a schematic structural diagram of the demulsifying module according to the embodiments of the present disclosure.

As shown in FIG. 15, in a second example of the present disclosure, a plurality of demulsifying parts 222 may be connected sequentially, and the demulsifying module 220 may be formed in a wave shape. For example, the top edge of one demulsifying part 222 may be connected with the top edge of a demulsifying part 222 at one side of it, and the bottom edge of the demulsifying part 222 may be connected with the bottom edge of a demulsifying part 222 at the other side of it. Preferably, the included angle between two adjacent demulsifying parts 222 may be a predetermined value, and thereby the structure of the demulsifying device 20 is more reasonable.

Each of the demulsifying parts 222 may be in a sheet shape or plate shape. Specifically, the cross section of the second receiving cavity 211 may be in a rectangular or square shape, the top edge of each demulsifying part 222 contacts with the top wall surface of the second receiving cavity 211, the bottom edge of each demulsifying part 222 contacts with the bottom wall surface of the second receiving cavity 211, and the side edges of each demulsifying part 222 contacts with the side wall surfaces of the second receiving cavity 211.

Figure 7:
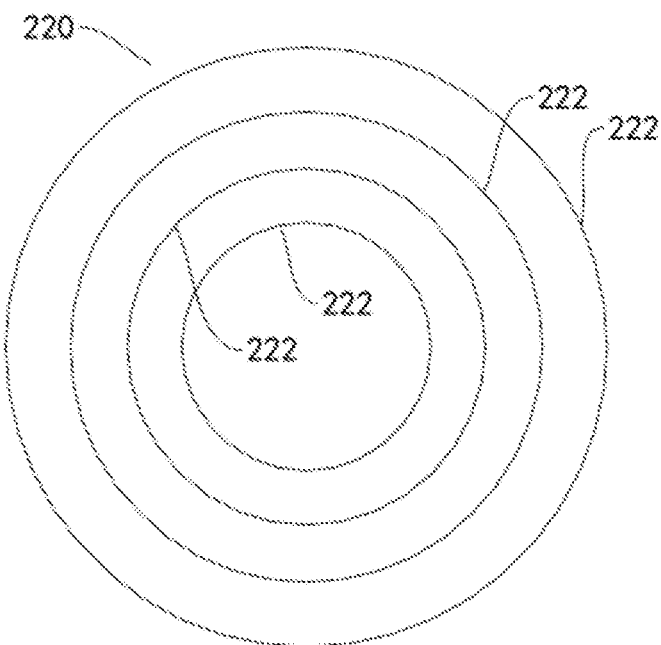
FIG. 7 is a side view of the demulsifying module according to the embodiments of the present disclosure.

As shown in FIG. 7, in a third example of the present disclosure, each demulsifying part 222 may be in a cylindrical shape, i.e., the cross section of each demulsifying part 222 may be in an annular shape. A plurality of demulsifying parts 222 may be sleeved around each other together sequentially. The oil-water mixture may flow through the plurality of demulsifying parts 222 from interior to exterior or flow through the plurality of demulsifying parts 222 from exterior to interior. Preferably, every two adjacent demulsifying parts 222 may contact with each other, thereby making the structure of the demulsifying module 220 more compact.

Figure 8:
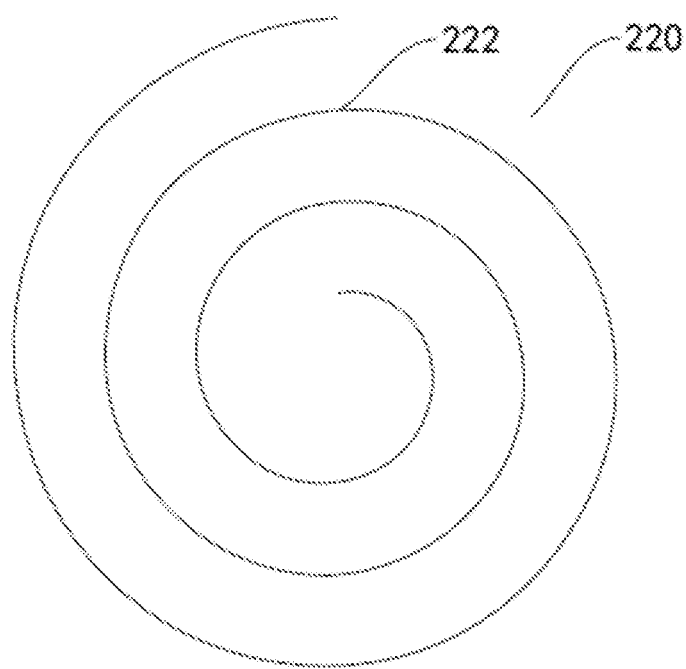
FIG. 8 is a side view of the demulsifying module according to the embodiments of the present disclosure.

As shown in FIG. 8, the demulsifying module 220 may be curled into a spiral shape. Thus, the structure of the demulsifying module 220 is more reasonable. Preferably, the parts of the demulsifying module 220 in two adjacent turns may contact with each other, thereby making the structure of the demulsifying module 220 more compact.

At least a part of the edge of each through-hole 221 of the demulsifying module 220 may be linear. Thus, the water-in-oil structure can be cut more effectively, and thereby more water droplets wrapped by the oil phase can be released.

Preferably, the through-holes 221 of the demulsifying module 220 may be polygonal holes. Thus, an included angle can be formed between two adjacent linear edges of each through-hole 221, and thereby the water-in-oil structure can be cut more effectively, and thereby more water droplets wrapped by the oil phase can be released.

More preferably, the through-holes 221 of the demulsifying module 220 may be in a regular polygonal shape. Thus, an included angle can be formed between two adjacent linear edges of each through-hole 221, and thereby the water-in-oil structure can be cut more effectively, and thereby more water droplets wrapped by the oil phase can be released.

Optimally, the through-holes 221 may be regular hexagonal holes. Thus, the through-holes 221 have enough edges to cut the water-in-oil structure more effectively, and the demulsifying module 220 has a greater flow channel (the total cross-sectional area of the plurality of through-holes 221 is larger), so that the throughput and processing speed of the demulsifying module 220 can be improved.

As shown in FIG. 6, each of the second shell 210 and the demulsifying module 220 is arranged horizontally. For example, the second shell 210 may be a horizontal tube. In the process of demulsifying the oil-water mixture with the demulsifying module 220, if the flow direction of the oil-water mixture is perpendicular to the through-holes 221 (i.e., the flow direction of the oil-water mixture is perpendicular to the cross sections of the through-holes 221), the demulsifying module 220 attains the highest cutting efficiency against the oil-water mixture. If both the second shell 210 and the demulsifying module 220 are arranged horizontally, the oil-water mixture can flow in the radial direction of the demulsifying module 220 (from inside to outside or from outside to inside), and thereby the flow direction of the oil-water mixture is perpendicular to the through-holes 221.

If both the second shell 210 and the demulsifying module 220 are arranged vertically or obliquely, the flow direction of the oil-water mixture is not perpendicular to the through-holes 221 under the gravity action of the oil-water mixture, consequently the cutting efficiency of the demulsifying module 220 against the oil-water mixture is decreased.

Figure 5:
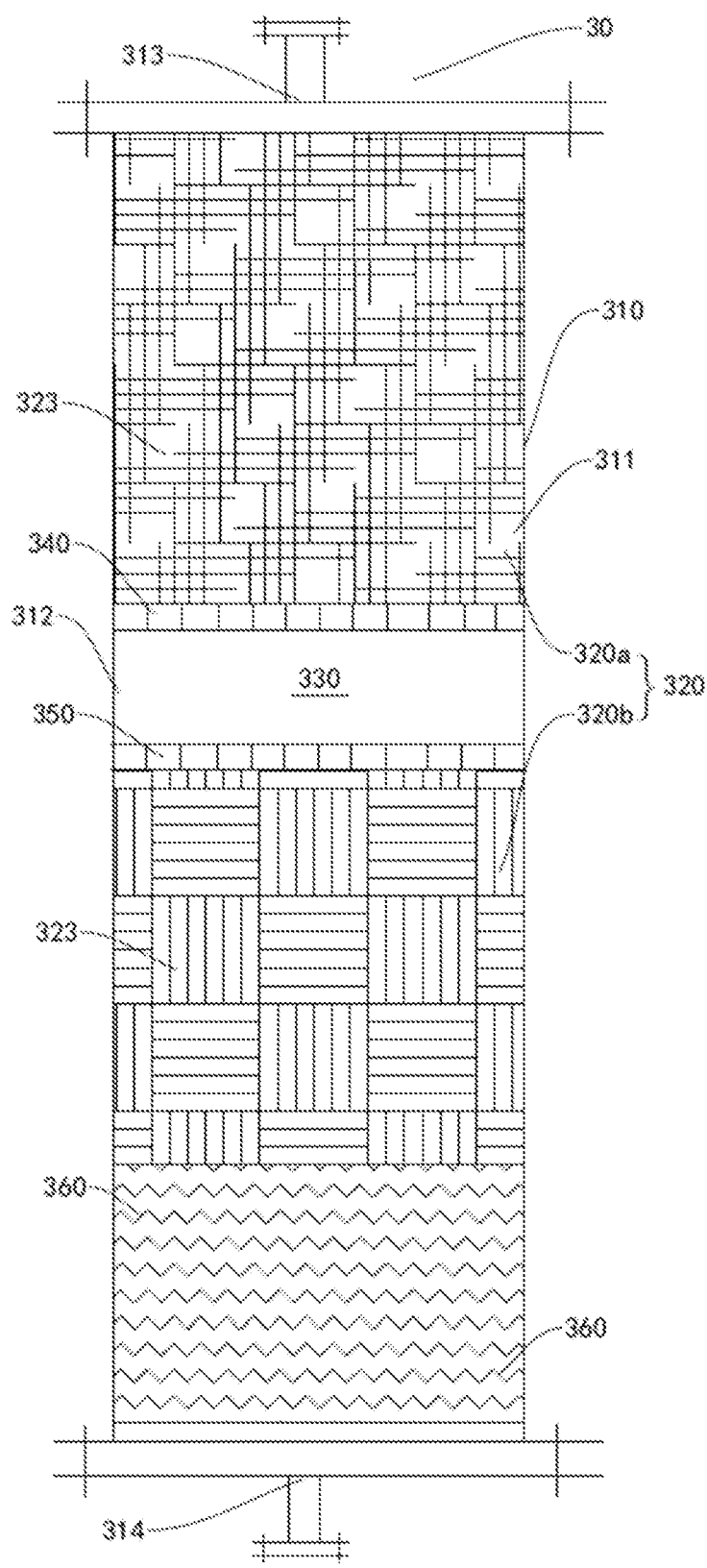
FIG. 5 is a schematic structural diagram of the separating device according to another embodiment of the present disclosure.

As shown in FIGS. 5 and 6, the separating device 30 may comprise a third shell 310, a first separating module 320a, and a second separating module 320b. The third shell 310 may have a third receiving cavity 311, and may be provided with an liquid inlet 312, a light phase outlet 313 and a heavy phase outlet 314 that communicate with the third receiving cavity 311. The liquid inlet 312 of the third shell 310 communicates with the liquid outlet 213 of the second shell 210.

The first separating module 320a and the second separating module 320b may be arranged in the third receiving cavity 311, and the liquid inlet 312 of the third shell 310 may be disposed between the first separating module 320a and the second separating module 320b. For example, the first separating module 320a may be disposed above the liquid inlet 312 of the third shell 310, and the second separating module 320b may be disposed below the liquid inlet 312 of the third shell 310.

Each of the first separating module 320a and the second separating module 320b may comprise a fiber braided layer 323 woven from oleophilic and hydrophobic filaments 321 and hydrophilic and oleophobic filaments 322. The oleophilic and hydrophobic filaments 321 and the hydrophilic and oleophobic filaments 322 are arranged in an intersecting manner to form intersections.

The oil-water mixture leaving the demulsifying device 20 may be delaminated to form a light phase and a heavy phase. If the crude oil is light crude oil, then the crude oil is the light phase, while the water is the heavy phase; if the crude oil is heavy crude oil, then the crude oil is the heavy phase, while the water is the light phase. The following description is based on an example in which the crude oil is the light phase and the water is the heavy phase.

In the case that the crude oil is light crude oil, the light phase may be driven to flow through the first separating module 320a, and the heavy phase may be driven to flow through the second separating module 320b, since the light phase contains a small amount of water and the heavy phase contains a small amount of crude oil.

The water in the light phase can flow along the hydrophilic and oleophobic filaments 322. When water droplets flow to the intersections of the hydrophilic and oleophobic filaments 322 and the oleophilic and hydrophobic filaments 321, the water droplets stay there; as more water droplets flow to and gather at the intersections continuously, the water droplets coalesce and grow at the intersections, i.e., the small water droplets gradually coalesce and grow into greater water droplets at the intersections. When the water droplets are big enough (at that point, the self-gravity of the coalesced water droplets exceeds the surface tension between the water droplets and the hydrophilic and oleophobic filaments 322), they will fall off the surfaces of the hydrophilic and oleophobic filaments 322 and move downward, so that the water droplets settle down and are separated. For example, the water droplets can flow downwards and return to the steady flow area 330. The crude oil can flow upwards and flow out of the separating device 30 through the light phase outlet 313.

The crude oil in the heavy phase can flow along the oleophilic and hydrophobic filaments 321. When the crude oil flows to the intersections of the hydrophilic and oleophobic filaments 322 and the oleophilic and hydrophobic filaments 321, the oil droplets will stay there; as more oil droplets flow to and gather at the intersections continuously, they coalesce and grow at the intersections, i.e., the small oil droplets gradually coalesce and grow into greater oil droplets at the intersections. When the oil droplets are big enough (at that point, the buoyancy of the coalesced oil droplets exceeds the surface tension between the oil droplets and the oleophilic and hydrophobic filaments 321), they will disengage from the surfaces of the oleophilic and hydrophobic filaments 321 and move upwards, so that the oil droplets settle down and are separated. For example, the oil droplets can flow upwards and return to the steady flow area 330. The water can flow downwards and flow out of the separating device 30 through the heavy phase outlet 314. In the case that the crude oil is heavy crude oil, the light phase may be driven to flow through the first separating module 320a, and the heavy phase may be driven to flow through the second separating module 320b, since the light phase contains a small amount of crude oil and the heavy phase contains a small amount of water.

The crude oil in the light phase can flow along the oleophilic and hydrophobic filaments 321. When the oil droplets flow to the intersections of the hydrophilic and oleophobic filaments 322 and the oleophilic and hydrophobic filaments 321, they stay there; as more oil droplets flow to and gather at the intersections continuously, the oil droplets can coalesce and grow up at the intersections, i.e., the small oil droplets gradually coalesce and grow into greater oil droplets at the intersections. When the oil droplets are big enough (at that point, the self-gravity of the coalesced oil droplets exceeds the surface tension between the oil droplets and the oleophilic and hydrophobic filaments 321), the oil droplets will fall off the surfaces of the oleophilic and hydrophobic filaments 321 and move downwards, so that the oil droplets settle down and are separated. For example, the of droplets can flow downwards and return to the steady flow area 330. The water can flow upwards and flow out of the separating device 30 through the light phase outlet 313.

The water in the heavy phase can flow along the hydrophilic and oleophobic filaments 322. When the water droplets flow to the intersections of the hydrophilic and oleophobic filaments 322 and the oleophilic and hydrophobic filaments 321, the water droplets stay there; as more water droplets flow to and gather at the intersections continuously, the water droplets coalesce and grow at the intersections, i.e., the small water droplets gradually coalesce and grow into greater water droplets at the intersections. When the water droplets are big enough (at that point, the buoyancy of the coalesced water droplets exceeds the surface tension between the water droplets and the hydrophilic and oleophobic filaments 322), they will disengage from the surfaces of the hydrophilic and oleophobic filaments 322 and move upwards, so that the water droplets settle down and are separated. For example, the water droplets can flow upwards and return to the steady flow area 330. The crude oil can flow downwards and flow out of the separating device 30 through the heavy phase outlet 314.

In the separating device 30 according to the embodiments of the present disclosure, by providing a first separating module 320a and a second separating module 320b and arranging the oleophilic and hydrophobic filaments 321 and the hydrophilic and oleophobic filaments 322 in each of the first separating module 320a and the second separating module 320b in an intersecting manner, the water phase and the oil phase can be separated from each other effectively, fully, and quickly. Thus, waste water with acceptable oil content can be obtained, and the removal rate of water in the crude oil can be higher than 99%.

Therefore, the separating device 30 according to the embodiments of the present disclosure has advantages including complete oil-water separation, high oil-water separation speed, and short retention time, etc.

When demulsification is carried out for the oil-water mixture flowing out of the washing and desalting device 10 with the demulsifying device 20, there is no particular restriction on the conditions of demulsification, as long as the oil-water mixture flows through the demulsifying device 20.

Preferably, the temperature of the oil-water mixture entering the demulsifying device 20 is 5° C.-200° C., more preferably, the temperature of the oil-water mixture entering the demulsifying device 20 is 50° C.-150° C. Further preferably, the temperature of the oil-water mixture entering the demulsifying device 20 is 70° C. -120° C. Optimally, the temperature of the oil-water mixture entering the demulsifying device 20 is 80° C.-100° C.

When separation is carried out for the oil-water mixture flowing out of the demulsifying device 20 with the separating device 30, there is no particular restriction on the conditions of separation, as long as the light phase of the oil-water mixture flows through the first separating module 320a and the heavy phase of the oil-water mixture flows through the second separating module 320b.

The retention time of the oil-water mixture in the demulsifying device 20 is 0.5 min.-5 min. Preferably, the retention time of the oil-water mixture in the demulsifying device 20 is 0.5 min.-3 min. More preferably, the retention time of the oil-water mixture in the demulsifying device 20 is 1 min.

The retention time of the oil phase of the oil-water mixture in the separating device 30 is 0.5 min.-10 min. Preferably, the retention time of the oil phase of the oil-water mixture in the separating device 30 is 1 min.-5 min. More preferably, the retention time of the oil phase of the oil-water mixture in the separating device 30 is 3 min. Preferably, the temperature of the heavy phase flowing through the second separating module 320b may be 5° C.-200° C., the pressure of the heavy phase may be 0.1 MPaG-2 MPaG; the temperature of the light phase flowing through the first separating module 320a may be 5° C. -200° C., and the pressure of the light phase may be 0.1 MPaG-2 MPaG. More preferably, the temperature of the heavy phase flowing through the second separating module 320b may be 50° C. -150° C., the pressure of the heavy phase may be 0.5 MPaG-1.5 MPaG; the temperature of the light phase flowing through the first separating module 320a may be 50° C.-150° C., and the pressure of the light phase may be 0.5 MPaG-1.5 MPaG.

Further preferably, the temperature of the heavy phase flowing through the second separating module 320b may be 70° C.-120° C., the pressure of the heavy phase may be 0.7 MPaG-1.3 MPaG; the temperature of the light phase flowing through the first separating module 320a may be 70° C.-120° C., and the pressure of the light phase may be 0.7 MPaG-1.3 MPaG.

Optimally, the temperature of the heavy phase flowing through the second separating module 320b may be 80° C.-100° C., the pressure of the heavy phase may be 0.9 MPaG-1.1 MPaG; the temperature of the light phase flowing through the first separating module 320a may be 80° C.-100° C., and the pressure of the light phase may be 0.9 MPaG-1.1 MPaG.

The first separating module 320a and the second separating module 320b may be arranged in the horizontal direction, i.e., the separating device 30 may be a horizontal separating device.

As shown in FIGS. 5 and 6, the first separating module 320a may be disposed above the second separating module 320b, and the light phase outlet 313 may be disposed above the heavy phase outlet 314, i.e., the separating device 30 may be a vertical separation device. Thus, the gravity of the heavy phase may also be utilized to separate the heavy phase from the light phase, and thereby the separating effect of the first separating module 320a and the second separating module 320b can be further improved, so as to reduce the height of the first separating module 320a and the second separating module 320b and thereby reduce the height of the separating device 30.

A plurality of fiber braided layers 323 may be provided, and the plurality of fiber braided layers 323 may be stacked together. Preferably, every two adjacent fiber braided layers 323 may contact with each other, thereby making the structures of the first separating module 320a and the second separating module 320b more compact.

As shown in FIGS. 5 and 6, each fiber braided layer 323 of the first separating module 320a may be disposed generally horizontally, and each fiber braided layer 323 of the second separating module 320b may be disposed generally horizontally.

Preferably, the oleophilic and hydrophobic filaments 321 may be made of at least one of polyester, polyethylene, polypropylene, polyvinyl chloride, polytetrafluoroethylene, acrylics, nylon, and materials subjected to oleophilic and hydrophobic treatment on the surface, and the hydrophilic and oleophobic filaments 322 may be made of natural macromolecular polymers with carboxyl, amino or hydroxyl groups on the main chain or side chains or materials subjected to hydrophilic and oleophobic treatment on the surface. More preferably, the oleophilic and hydrophobic filaments 321 may be polyester filaments, and the hydrophilic and oleophobic filaments 322 may be polypropylene filaments.

The ratio of the quantity of the light-phase affinitive filaments to the quantity of the heavy-phase affinitive filaments in the first separating module 320a is 1:(1-10), and the ratio of the quantity of the light-phase affinitive filaments to the quantity of the heavy-phase affinitive filaments in the second separating module 320b is (1-10):1.

In the case that the crude oil is the light phase and the water is the heavy phase, the ratio of the quantity of the oleophilic and hydrophobic filaments 321 to the quantity of the hydrophilic and oleophobic filaments 322 in the first separating module 320a may be 1:(1-10), and the ratio of the quantity of the oleophilic and hydrophobic filaments 321 to the quantity of the hydrophilic and oleophobic filaments 322 in the second separating module 320b may be (1-10):1. In the case that the crude oil is the heavy phase and the water is the light phase, the ratio of the quantity of the hydrophilic and oleophobic filaments 322 to the quantity of the oleophilic and hydrophobic filaments 321 in the first separating module 320a may be 1:(1-10), and the ratio of the quantity of the hydrophilic and oleophobic filaments 322 to the quantity of the oleophilic and hydrophobic filaments 321 in the second separating module 320b may be (1-10):1.

Preferably, the ratio of the quantity of the light-phase affinitive filaments to the quantity of the heavy-phase affinitive filaments in the first separating module 320a may be 1:(2-5), and the ratio of the quantity of the light-phase affinitive filaments to the quantity of the heavy-phase affinitive filaments in the second separating module 320b may be (2-5):1. More preferably, the ratio of the quantity of the light-phase affinitive filaments to the quantity of the heavy-phase affinitive filaments in the first separating module 320a may be 1:4, and the ratio of the quantity of the light-phase affinitive filaments to the quantity of the heavy-phase affinitive filaments in the second separating module 320b may be 4:1.

The ratio of the quantity of the light-phase affinitive filaments to the quantity of the heavy-phase affinitive filaments in the first separating module 320a may be determined according to the content of the heavy phase in the light phase, and the ratio of the quantity of the light-phase affinitive filaments to the quantity of the heavy-phase affinitive filaments in the second separating module 320b may be determined according to the content of the light phase in the heavy phase.

For example, when the heavy phase (water phase) is to be separated from the light phase (oil phase), the heavy phase is the dispersed phase; the lower the content of the heavy phase is, the smaller the quantity of the droplets of the dispersed phase is, then the smaller the quantity of the heavy-phase affinitive filaments can be, since the droplets of the heavy dispersed phase coalesce and grow into greater droplets on the heavy-phase affinitive filaments and thereby are separated away.

Figure 9:
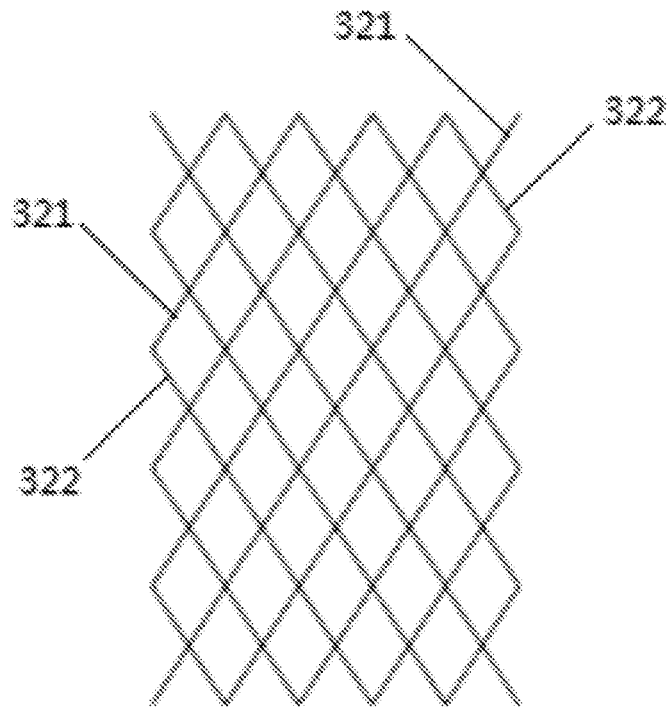
FIG. 9 is a partial schematic structural diagram of the fiber braided layer of the separating device according to the embodiments of the present disclosure.
Figure 10:
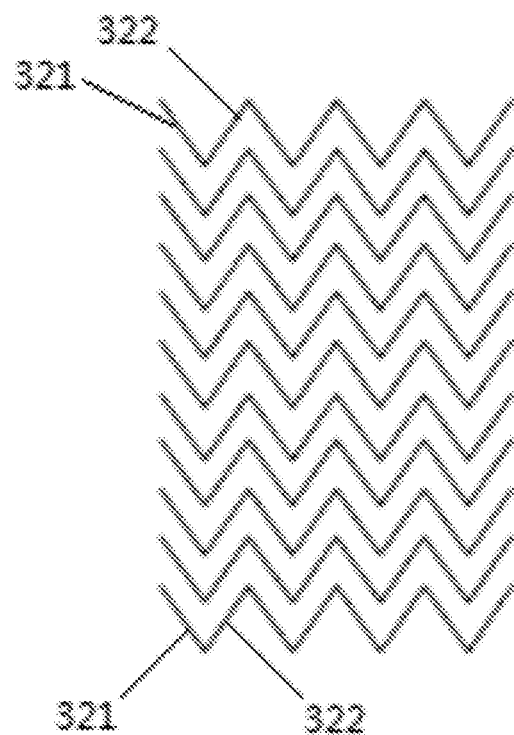
FIG. 10 is a partial schematic structural diagram of the fiber braided layer of the separating device according to the embodiments of the present disclosure.
Figure 11:
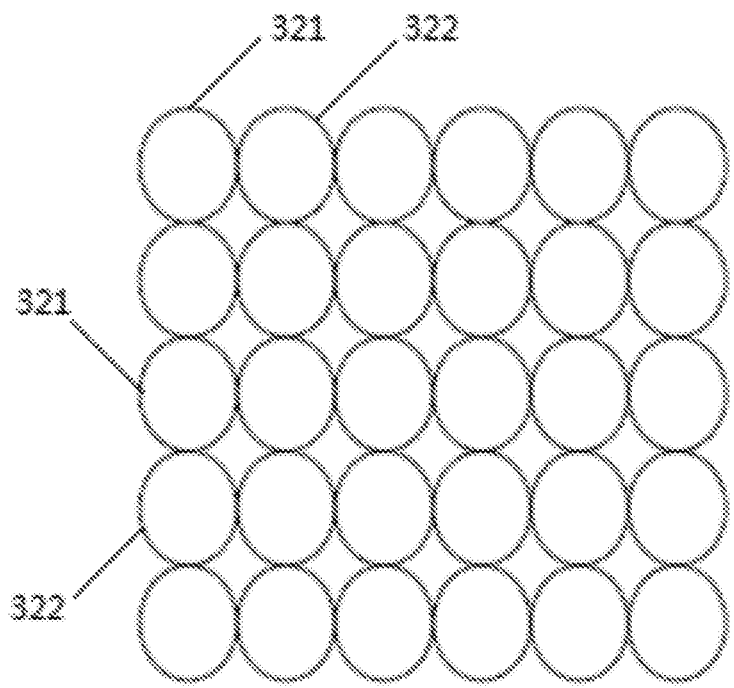
FIG. 11 is a partial schematic structural diagram of the fiber braided layer of the separating device according to the embodiments of the present disclosure.
Figure 12:
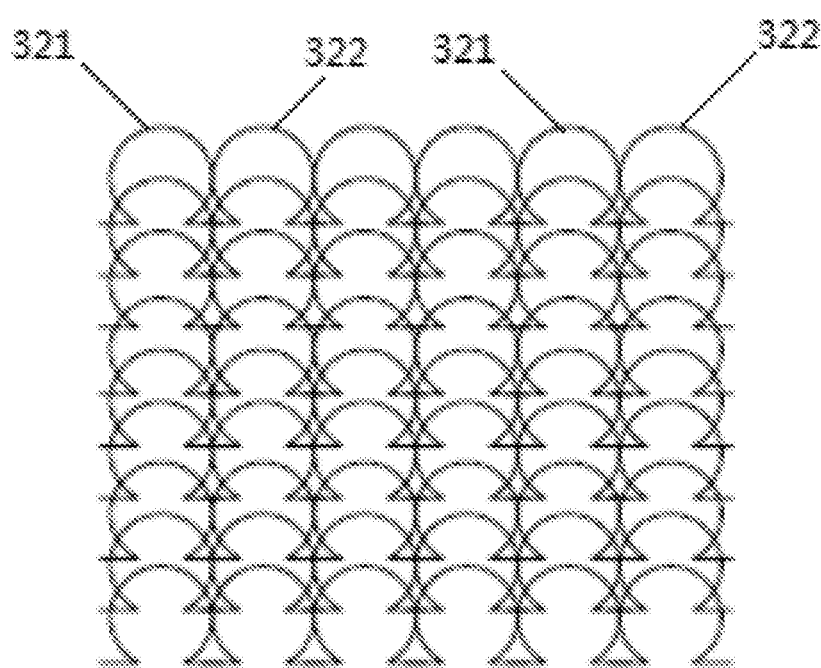
FIG. 12 is a partial schematic structural diagram of the fiber braided layer of the separating device according to the embodiments of the present disclosure.
Figure 13:
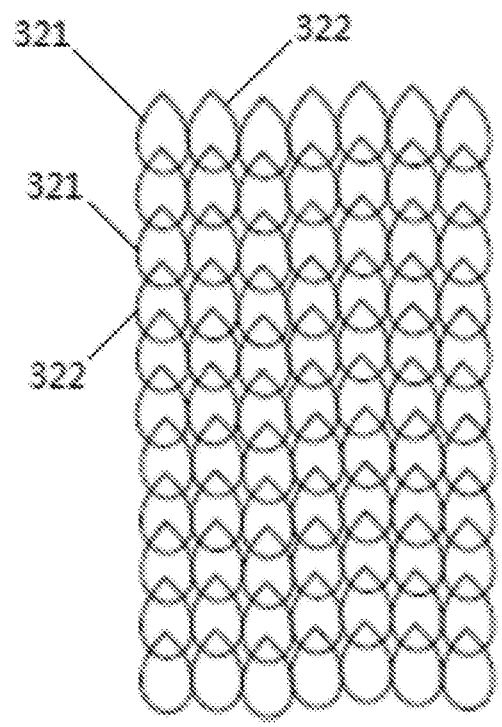
FIG. 13 is a partial schematic structural diagram of the fiber braided layer of the separating device according to the embodiments of the present disclosure.
Figure 14:
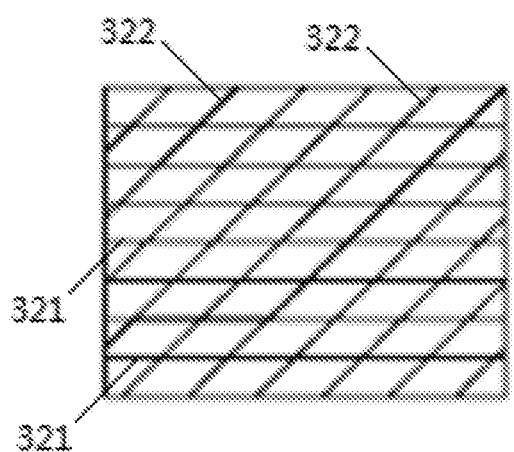
FIG. 14 is a partial schematic structural diagram of the fiber braided layer of the separating device according to the embodiments of the present disclosure.

In a specific example of the present disclosure, the oleophilic and hydrophobic filaments 321 and the hydrophilic and oleophobic filaments 322 are woven in an X-pattern (as shown in FIG. 9), V-pattern (as shown in FIG. 10), splay-pattern (as shown in FIG. 11), Ω-pattern (as shown in FIG. 12), water-drop pattern (as shown in FIG. 13), or diamond pattern (as shown in FIG. 14).

Preferably, the fiber braided layer 323 may have concave-convex structures. That is to say, the surface of the fiber braided layer 323 may be uneven.

The first separating module 320a and the second separating module 320b are spaced from each other to form a steady flow area 330 between them. The liquid inlet 312 of the separating device 30 may communicate with the steady flow area 330. By arranging a steady flow area 330 between the first separating module 320a and the second separating module 320b, not only material impact and biasing can be prevented, but also delamination between the oil phase and the water phase can be realized. Wherein no filling material is filled in the steady flow area 330, or a filling layer with a distributing function can be filled in the steady flow area 330, for example, a flow-guide grille or a similar filling layer may be filled in the steady flow area 330.

Preferably, the first separating module 320a and the second separating module 320b may be spaced apart from each other by a predetermined distance, so that material impact and biasing can be prevented better, and better delamination between the oil phase and the water phase can be realized.

As shown in FIGS. 5 and 6, the first separating module 320a and the second separating module 320b may be spaced apart from each other in the vertical direction, the first separating module 320a may be disposed above the second separating module 320b, and the liquid inlet 312 of the separating device 30 opposite and communicates with the steady flow area 330 in the horizontal direction.

As shown in FIGS. 5 and 6, the separating device 30 may further comprise a first liquid distributor 340 and a second liquid distributor 350.

The first liquid distributor 340 may be disposed in the third receiving cavity 311, and the first liquid distributor 340 may be disposed upstream of the first separating module 320a, i.e., the material (e.g., the light phase) flows through the first liquid distributor 340 first, and then flows through the first separating module 320a. The first liquid distributor 340 may comprise a plurality of first orifice plates stacked together.

The second liquid distributor 350 may be disposed in the third receiving cavity 311, and the second liquid distributor 350 may be disposed upstream of the second separating module 320b, i.e., the material (e.g., the heavy phase) flows through the second liquid distributor 350 first, and then flows through the second separating module 320b. The second liquid distributor 350 may comprise a plurality of second orifice plates stacked together.

Wherein the liquid inlet 312 of the third shell 310 may be disposed between the first liquid distributor 340 and the second liquid distributor 350. For example, the liquid inlet 312 of the third shell 310 may be disposed between the first liquid distributor 340 and the second liquid distributor 350 in the vertical direction.

With the first liquid distributor 340 and the second liquid distributor 350, the material can be distributed well initially. Good initial distribution of the material ensures that the throughput and retention time of the coalesced filling material are essentially the same on the entire cross section, the material flow is maintained in a stable and uniform state continuously in the coalesced dehydration/deoiling process as well. In other words, if the initial distribution of the material is not uniform, problems such as channel flow and biasing, etc. may occur, and consequently the efficiency of mass transfer may be affected.

Preferably, 5-10 first orifice plates are provided, each of the first orifice plates may be arranged horizontally, the diameter of each first orifice plate is 4 mm-8 mm, and the center distance between every two adjacent holes of each first orifice plate is 20 mm-30 mm; 5-10 second orifice plates are provided, each of the second orifice plates may be arranged horizontally, the diameter of each second orifice plate is 4 mm-8 mm, and the center distance between every two adjacent holes of each second orifice plate is 20 mm-30 mm.

As shown in FIGS. 5 and 6, the separating device 30 may further comprise a plurality of perforated corrugated plates 360 disposed downstream of the second separating module 320b, i.e., the material (e.g., the heavy phase) flows through the second separating module 320b first, and then flows through the plurality of perforated corrugated plates 360. The plurality of perforated corrugated plates 360 may be disposed in a spaced manner in the third receiving cavity 311 in a predetermined direction.

In that way, the tortuous channel and porous surface structure of the perforated corrugated plate 360 may be utilized to enhance the collision among the liquid droplets and promote the coalescence of the droplets, so that the heavy phase can move downwards along the pores in the surface of the perforated corrugated plate 360 more quickly and reach to the heavy phase outlet 314, and thereby is separated.

As shown in FIGS. 5 and 6, a plurality of perforated corrugated plates 360 may be disposed in a spaced manner in the third receiving cavity 311 in the vertical direction, and each perforated corrugated plate 360 may be disposed horizontally. Preferably, every two adjacent perforated corrugated plates 360 may be spaced apart from each other by 3 mm-6 mm, and the pores of the perforated corrugated plate 360 are arranged at the wave troughs of the perforated corrugated plates 360.

When dehydration and desalting is carried out for light crude oil, the oil-water mixture leaving the washing and desalting device 10 doesn't have to enter the demulsifying device 20; instead, the oil-water mixture leaving the washing and desalting device 10 may directly enter the separating device 30. Of course, alternatively the oil-water mixture leaving the washing and desalting device 10 may enter the demulsifying device 20 first and then enter the separating device 30.

Figure 2:
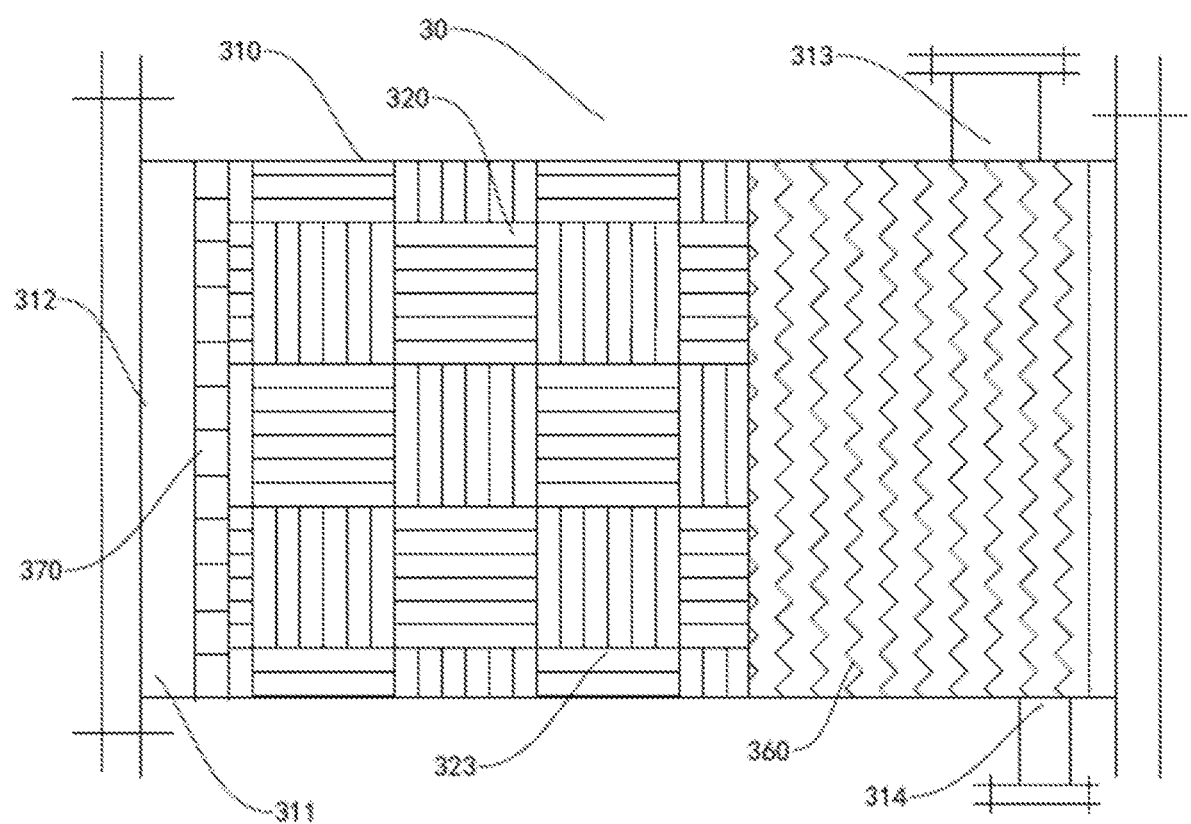
FIG. 2 is a schematic structural diagram of the separating device according to an embodiment of the present disclosure.

As shown in FIGS. 2 and 3, the separating device 30 may comprise a third shell 310 and a separating module 320. The third shell 310 may have a third receiving cavity 311, and may be provided with an liquid inlet 312, a light phase outlet 313 and a heavy phase outlet 314 that communicate with the third receiving cavity 311. The liquid inlet 312 of the third shell 310 may communicate with the liquid outlet 113 of the first shell 110.

The separating module 320 may be disposed in the third receiving cavity 311. The separating module 320 may comprise a fiber braided layer 323, which may be woven from oleophilic and hydrophobic filaments 321 and hydrophilic and oleophobic filaments 322. The oleophilic and hydrophobic filaments 321 and the hydrophilic and oleophobic filaments 322 are arranged in an intersecting manner to form intersections.

The oil-water mixture entering the third receiving cavity 311 can flow through the fiber braided layer 323. The water in the oil-water mixture can flow along the hydrophilic and oleophobic filaments 322. When the water droplets flow to the intersections of the hydrophilic and oleophobic filaments 322 and the oleophilic and hydrophobic filaments 321, the water droplets stays there; as more water droplets gather to the intersections continuously, the small water droplets gradually coalesce and grow into greater water droplets.

When the water droplets are big enough (at that point, the self-gravity of the coalesced water droplets exceeds the surface tension between the water droplets and the hydrophilic and oleophobic filaments 322), they will fall off the surfaces of the hydrophilic and oleophobic filaments 322 and move downward, so that the water droplets settle down and are separated, and can flow out of the separating device 30 through the heavy phase outlet 314. The crude oil in the oil-water mixture can flow out of the separating device 30 through the light phase outlet 313.

By arranging a separating module 320 and arranging the oleophilic and hydrophobic filaments 321 and the hydrophilic and oleophobic filaments 322 in the separating module 320 in an intersecting form, the separating device 30 according to the embodiments of the present disclosure can separate the water phase and the oil phase from each other effectively, fully, and quickly. Thus, waste water with acceptable oil content can be obtained, and the removal rate of water in the crude oil can be higher than 99%.

Therefore, the separating device 30 according to the embodiments of the present disclosure has advantages including complete oil-water separation, high oil-water separation speed, and short retention time, etc.

Though acceptable crude oil can be obtained by using a multi-stage electrodesalting process to carry out dehydration and desalting for non-inferior and non-heavy crude oil (common light crude oil), the oil content index in the resultant waste water can't meet the specification since the oil-water separation is not fine and accurate enough. By using the separating device 30 according to the embodiments of the present disclosure to separate the oil-water mixture, waste water with acceptable oil content can be obtained, and the removal rate of water in the crude oil can be higher than 99%, so as to obtain a crude oil that meets the specification.

When separation is carried out for the oil-water mixture flowing out of the washing and desalting device 10 with the separating device 30, there is no particular restriction on the conditions of separation, as long as the oil-water mixture flows through the separating module 320.

The retention time of the oil phase of the oil-water mixture in the separating device 30 is 0.5 min.-10 min. Preferably, the retention time of the oil phase of the oil-water mixture in the separating device 30 is 1 min.-5 min. More preferably, the retention time of the oil phase of the oil-water mixture in the separating device 30 is 3 min.

Preferably, the temperature of the oil-water mixture entering the separating device 30 may be 5° C.-200° C., and the pressure of the oil-water mixture may be 0.1 MPaG-2 MPaG. More preferably, the temperature of the oil-water mixture entering the separating device 30 is 50° C.-150° C., and the pressure of the oil-water mixture is 0.5 MPaG-1.5 MPaG.

Further preferably, the temperature of the oil-water mixture entering the separating device 30 is 70° C.-120° C., and the pressure of the oil-water mixture is 0.7 MPaG-1.3 MPaG. Optimally, the temperature of the oil-water mixture entering the separating device 30 is 80° C.-100° C., and the pressure of the oil-water mixture is 0.9 MPaG-1.1 MPaG.

A plurality of fiber braided layers 323 may be provided, and the plurality of fiber braided layers 323 may be stacked together. Preferably, every two adjacent fiber braided layers 323 may contact with each other, thereby making the structures of the first separating module 320a and the second separating module 320b more compact.

As shown in FIGS. 2 and 3, each of the fiber braided layers 323 may be disposed generally horizontally.

Preferably, the oleophilic and hydrophobic filaments 321 may be made of at least one of polyester, polyethylene, polypropylene, polyvinyl chloride, polytetrafluoroethylene, acrylics, nylon, and materials subjected to oleophilic and hydrophobic treatment on the surface, and the hydrophilic and oleophobic filaments 322 may be made of natural macromolecular polymers with carboxyl, amino or hydroxyl groups on the main chain or side chains or materials subjected to hydrophilic and oleophobic treatment on the surface, more preferably, the oleophilic and hydrophobic filaments 321 may be polyester filaments, and the hydrophilic and oleophobic filaments 322 may be polypropylene filaments.

The ratio of the quantity of the oleophilic and hydrophobic filaments 321 to the quantity of the hydrophilic and oleophobic filaments 322 may be (0.1-10):1. In other words, the ratio of the quantity of the oleophilic and hydrophobic filaments 321 to the quantity of the hydrophilic and oleophobic filaments 322 may be 10:1-1:10. Preferably, the ratio of the quantity of the oleophilic and hydrophobic filaments 321 to the quantity of the hydrophilic and oleophobic filaments 322 may be (0.5-5):1. More preferably, the ratio of the quantity of the oleophilic and hydrophobic filaments 321 to the quantity of the hydrophilic and oleophobic filaments 322 may be 1:1.

The ratio of the quantity of the oleophilic and hydrophobic filaments 321 to the quantity of the hydrophilic and oleophobic filaments 322 may be determined according to the content of the water phase in the oil phase. When the water phase is to be separated from the oil phase, the water phase is the dispersed phase, the lower the content of the water phase is, the smaller the quantity of the droplets of the dispersed phase is, then the smaller the quantity of the hydrophilic filaments can be, since the droplets of the dispersed water phase coalesce and grow into greater droplets on the hydrophilic filaments and thereby are separated away.

In a specific example of the present disclosure, the oleophilic and hydrophobic filaments 321 and the hydrophilic and oleophobic filaments 322 are woven in an X-pattern (as shown in FIG. 9), V-pattern (as shown in FIG. 10), splay-pattern (as shown in FIG. 11), Ω-pattern (as shown in FIG. 12), water-drop pattern (as shown in FIG. 13), or diamond pattern (as shown in FIG. 14).

Preferably, the fiber braided layer 323 may have concave-convex structures.

As shown in FIGS. 2 and 3, the separating device 30 may further comprise a liquid distributor 370, which may be disposed upstream of the separating module 320, i.e., the oil-water mixture flows through the liquid distributor 370 first, and then flows through the separating module 320. The liquid distributor 370 may comprise a plurality of orifice plates stacked together.

With the liquid distributor 370, the material (the oil-water mixture) can be distributed well initially. Good initial distribution of the material ensures that the throughput and retention time of the coalesced filling material are essentially the same on the entire cross section, the material flow is maintained in a stable and uniform state continuously in the coalesced dehydration/deoiling process as well.

Preferably, 5-10 orifice plates are provided, each of the orifice plates may be arranged vertically, the diameter of each orifice plate is 4 mm-8 mm, and the center distance between every two adjacent holes of each orifice plate is 20 mm-30 mm.

In an embodiment of the present disclosure, the third receiving cavity 311 may have a static separating cavity disposed downstream of the separating module 320. Thus, the water phase and the oil phase can be statically separated in the static separating cavity.

As shown in FIGS. 2 and 3, in another embodiment of the present disclosure, the separating device 30 may further include a plurality of perforated corrugated plates 360 disposed downstream of the separating module 320, i.e., the oil-water mixture flows through the separating module 320 first, and then flows through the plurality of perforated corrugated plates 360. The plurality of perforated corrugated plates 360 may be disposed in a spaced manner in the third receiving cavity 311 in a predetermined direction.

In that way, the tortuous channel and porous surface structure of the perforated corrugated plate 360 may be utilized to enhance the collision among the liquid droplets and promote the coalescence of the droplets, so that the water phase can move downwards along the pores in the surface of the perforated corrugated plate 360 more quickly and reach to the heavy phase outlet 314, and thereby is separated.

As shown in FIGS. 2 and 3, a plurality of perforated corrugated plates 360 may be disposed in a spaced manner in the third receiving cavity 311 in the horizontal direction, and each perforated corrugated plate 360 may be disposed vertically. Preferably, every two adjacent perforated corrugated plates 360 may be spaced apart from each other by 3 mm-6 mm, and the pores of the perforated corrugated plate 360 are arranged at the wave troughs of the perforated corrugated plate 360.

The end points and any value in the ranges disclosed by the present disclosure are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined with each other to obtain one or more new numeric ranges, which shall be deemed as having been disclosed specifically in this document.

Hereunder the present disclosure will be further detailed in examples. In the following examples, the salt content in the crude oil is measured as per GB/T 6532-2012, and the water content in the crude oil is measured as per GB/T25986.

Example 1

The desalting and dehydrating system 1 is utilized to process light crude oil (the main properties of the light crude oil are shown in Table 1). The desalting and dehydrating system 1 comprises a washing and desalting device 10 and a separating device 30.

The ratio of the length of the first receiving cavity 111 to the diameter of the cross section of the first receiving cavity 111 is 70:1. The first receiving cavity 111 is provided with a plurality of oleophilic and hydrophobic filaments, the length direction of each of the oleophilic and hydrophobic filaments is consistent with the length direction of the first receiving cavity 111, and the filling density of the oleophilic and hydrophobic filaments is 5%. The ratio of the quantity of the oleophilic and hydrophobic filaments 321 to the quantity of the hydrophilic and oleophobic filaments 322 in the fiber braided layer 323 of the separating device 30 is 10:1.

The light crude oil is mixed with water to obtain an oil-water mixture, in which the weight percentage of the water phase is 1 wt %. The oil-water mixture is transferred into the washing and desalting device 10, so that the oil-water mixture flows over the surfaces of the plurality of oleophilic and hydrophobic filaments (filaments 120). Wherein the volumetric space velocity of the oil-water mixture is 5 h$^{-1}$, the temperature is 5° C., and the pressure is 0.05 MPaG, and the retention time of the oil-water mixture in the washing and desalting device 10 is 1 min. The oil-water mixture flowing out of the washing and desalting device 10 is separated by the separating device 30 so as to obtain an oil phase and a water phase. Wherein the temperature of the oil-water mixture entering the separating device 30 may be 5° C., the pressure may be 0.1 MPaG, and the retention time of the oil phase of the oil-water mixture in the separating device 30 is 5 min.

After the oil-water mixture is washed and desalted and separated, the salt content in the crude oil (oil product) is 2.93 mg/L, the water content in the crude oil is 498 ppm, and the oil content in the water is 86 ppm.

TABLE 1

| Main Properties of the Crude Oil | |
| --- | --- |
| Density (20° C.), g/cm$^3$ | 0.882 |
| Kinematic viscosity (20° C.), mm$^2$/s | 41.76 |
| Acid value (KOH), mg/g | 0.27 |
| Salt content, mg/L | 67.30 |
| Water content, wt % | 1.09 |

Example 2

The desalting and dehydrating system 1 is utilized to process light crude oil (the main properties of the light crude oil are shown in Table 1). The differences of the desalting and dehydrating system 1 in the example 2 from the desalting and dehydrating system 1 in the example 1 are:

The ratio of the quantity of the oleophilic and hydrophobic filaments 321 to the quantity of the hydrophilic and oleophobic filaments 322 of the fiber braided layer 323 in the separating device 30 is 0.1:1, the ratio of the length of the first receiving cavity 111 to the diameter of the cross section of the first receiving cavity 111 is 100:1, and the filling density of the oleophilic and hydrophobic filaments is 3%.

The light crude oil is mixed with water to obtain an oil-water mixture, in which the weight percentage of the water phase is 20 wt %. The oil-water mixture is transferred into the washing and desalting device 10, so that the oil-water mixture flows over the surfaces of the plurality of oleophilic and hydrophobic filaments (filaments 120). Wherein the volumetric space velocity of the oil-water mixture is 50 h$^{-1}$, the temperature is 150° C., and the pressure is 0.5 MPaG, and the retention time of the oil-water mixture in the washing and desalting device 10 is 5 min.

The oil-water mixture flowing out of the washing and desalting device 10 is separated by the separating device 30 so as to obtain an oil phase and a water phase. Wherein the temperature of the oil-water mixture entering the separating device 30 may be 150° C., the pressure may be 1.5 MPaG, and the retention time of the oil phase of the oil-water mixture in the separating device 30 is 0.5 min. After the oil-water mixture is washed and desalted and separated, the salt content in the crude oil (oil product) is 1.06 mg/L, the water content in the crude oil is 292 ppm, and the oil content in the water is 27 ppm.

Example 3

The desalting and dehydrating system 1 is utilized to process light crude oil (the main properties of the light crude oil are shown in Table 1). The differences of the desalting and dehydrating system 1 in the example 3 from the desalting and dehydrating system 1 in the example 1 are:

The plurality of filaments 120 arranged in the first receiving cavity 111 comprise oleophilic and hydrophobic filaments and metal filaments, and the ratio of the quantity of the oleophilic and hydrophobic filaments to the quantity of the metal filaments is 1,000:1. The ratio of the quantity of the oleophilic and hydrophobic filaments 321 to the quantity of the hydrophilic and oleophobic filaments 322 of the fiber braided layer 323 in the separating device 30 is 5:1, the ratio of the length of the first receiving cavity 111 to the diameter of the cross section of the first receiving cavity 111 is 45:1, and the filling density of the filaments 120 is 9%.

The light crude oil is mixed with water to obtain an oil-water mixture, in which the weight percentage of the water phase is 5 wt %. The oil-water mixture is transferred into the washing and desalting device 10, so that the oil-water mixture flows over the surfaces of the plurality of filaments 120. Wherein the volumetric space velocity of the oil-water mixture is 20 h$^{-1}$, the temperature is 90° C., and the pressure is 0.3 MPaG, and the retention time of the oil-water mixture in the washing and desalting device 10 is 0.5 min.

The oil-water mixture flowing out of the washing and desalting device 10 is separated by the separating device 30 so as to obtain an oil phase and a water phase. Wherein the temperature of the oil-water mixture entering the separating device 30 may be 90° C., the pressure may be 1 MPaG, and the retention time of the oil phase of the oil-water mixture in the separating device 30 is 10 min.

After the oil-water mixture is washed and desalted and separated, the salt content in the crude oil (oil product) is 1.53 mg/L, the water content in the crude oil is 226 ppm, and the oil content in the water is 25 ppm.

Example 4

The desalting and dehydrating system 1 is utilized to process light crude oil (the main properties of the light crude oil are shown in Table 1). The differences of the desalting and dehydrating system 1 in the example 4 from the desalting and dehydrating system 1 in the example 3 are:

The ratio of the quantity of the oleophilic and hydrophobic filaments to the quantity of the metal filaments is 1:1. The ratio of the quantity of the oleophilic and hydrophobic filaments 321 to the quantity of the hydrophilic and oleophobic filaments 322 of the fiber braided layer 323 in the separating device 30 is 0.5:1, the ratio of the length of the first receiving cavity 111 to the diameter of the cross section of the first receiving cavity 111 is 10:1, and the filling density of the oleophilic and hydrophobic filaments is 1%.

The light crude oil is mixed with water to obtain an oil-water mixture, in which the weight percentage of the water phase is 15 wt %. The oil-water mixture is transferred into the washing and desalting device 10, so that the oil-water mixture flows over the surfaces of the plurality of filaments 120. Wherein the volumetric space velocity of the oil-water mixture is 30 h$^{-1}$, the temperature is 200° C., and the pressure is 2 MPaG, and the retention time of the oil-water mixture in the washing and desalting device 10 is 2 min.

The oil-water mixture flowing out of the washing and desalting device 10 is separated by the separating device 30 so as to obtain an oil phase and a water phase. Wherein the temperature of the oil-water mixture entering the separating device 30 may be 200° C., the pressure may be 2 MPaG, and the retention time of the oil phase of the oil-water mixture in the separating device 30 is 3 min.

After the oil-water mixture is washed and desalted and separated, the salt content in the crude oil (oil product) is 0.94 mg/L, the water content in the crude oil is 245 ppm, and the oil content in the water is 25 ppm.

TABLE 2

| Main Properties of the Crude Oil | |
| --- | --- |
| Density (20° C.), g/cm$^3$ | 0.962 |
| Kinematic viscosity (20° C.), mm$^2$/s | 61.76 |
| Acid value (KOH), mg/g | 0.36 |
| Salt content, mg/L | 93.87 |
| Water content, wt % | 2.24 |

Example 5

The desalting and dehydrating system 1 is utilized to process light crude oil (the main properties of the light crude oil are shown in Table 1). The differences of the desalting and dehydrating system 1 in the example 5 from the desalting and dehydrating system 1 in the example 3 are:

The ratio of the quantity of the oleophilic and hydrophobic filaments to the quantity of the metal filaments is 100:1. The ratio of the quantity of the oleophilic and hydrophobic filaments 321 to the quantity of the hydrophilic and oleophobic filaments 322 of the fiber braided layer 323 in the separating device 30 is 1:1, the ratio of the length of the first receiving cavity 111 to the diameter of the cross section of the first receiving cavity 111 is 30:1, and the filling density of the oleophilic and hydrophobic filaments is 4%.

The light crude oil is mixed with water to obtain an oil-water mixture, in which the weight percentage of the water phase is 10 wt %. The oil-water mixture is transferred into the washing and desalting device 10, so that the oil-water mixture flows over the surfaces of the plurality of filaments 120. Wherein the volumetric space velocity of the oil-water mixture is 10 h$^{-1}$, the temperature is 50° C., and the pressure is 0.1 MPaG, and the retention time of the oil-water mixture in the washing and desalting device 10 is 3 min.

The oil-water mixture flowing out of the washing and desalting device 10 is separated by the separating device 30 so as to obtain an oil phase and a water phase. Wherein the temperature of the oil-water mixture entering the separating device 30 may be 50° C., the pressure may be 0.5 MPaG, and the retention time of the oil phase of the oil-water mixture in the separating device 30 is 1 min.

After the oil-water mixture is washed and desalted and separated, the salt content in the crude oil (oil product) is 0.97 mg/L, the water content in the crude oil is 238 ppm, and the oil content in the water is 23 ppm.

Comparative Example 1

A conventional three-stage electrodesalting and electrodehydrating apparatus is used to carry out desalting and dehydration for crude oil (the main properties of the crude oil are shown in Table 1). The structure of the three-stage electrodesalting and electrodehydrating apparatus is as follows: a horizontal structure, the internal space is divided into an upper space and a lower space, the upper space is an electrical field space, and the lower space is a space for oil-water separation, a control section with water and water-oil interface is disposed between the upper space and the lower space; several layers of horizontal electrode plates are disposed in the electrical field space; in addition, suspension insulators, hanging boards, insulating rods for lead wires, oil sprayer, and flow meter, etc. are provided in the electrical field space. High voltage is supplied to the electrode plates to form a high-voltage electric field, and a weak electric field is formed between the lower electrode plate and the water interface in the bottom portion of the dehydrator.

The operating conditions are as follows: operating temperature: 125-130° C.; operating pressure: 0.8-1.2 MPaG; retention time: 36 min.; the total amount of injected water is 5 wt % of the mass of the raw oil. After desalting and dehydration with the electrodesalting and electrodehydrating apparatus, the salt content in the raw oil is 6.7 mg/L-10.2 mg/L, the water content is 1,245 ppm-3,347 ppm, and the oil content in the water is 927 ppm.

Comparative Example 2

The three-stage electrodesalting and electrodehydrating apparatus in the comparative example 1 is used to carry out desalting and dehydration for crude oil (the main properties of the crude oil are shown in Table 2). The operating conditions are as follows: operating temperature: 125-130° C.; operating pressure: 0.8-1.2 MPaG; retention time: 36 min.; the total amount of injected water is 5 wt % of the mass of the raw oil.

After desalting and dehydration with the electrodesalting and electrodehydrating apparatus, the salt content in the raw oil is 17.5 mg/L-18.2 mg/L, the water content is 17,600 ppm-19,400 ppm, and the oil content in the water is 1,102 ppm.

Comparative Example 3

The crude oil and the water are mixed for three times with a static mixer first, the oil-water mixture obtained through the mixing is introduced into a coalescing separator filled with 6 Pall coalescing filtering elements, and a filling material for corrugated plate separation is filled after the filtering elements. The apparatus is utilized to carry out desalting and dehydration for crude oil (the main properties of the crude oil are shown in Table 1).

The operating conditions are as follows: operating temperature: 125-130° C.; operating pressure: 0.7-0.9 MPaG; retention time: 21 min.; the total amount of injected water is 5 wt % of the mass of the raw oil. After washing and desalting by means of water injection and coalescing dehydration with the Pall coalescing filtering elements, the salt content in the raw oil is 13.6 mg/L-15.7 mg/L, the water content is 15,400 ppm-18,800 ppm, and the oil content in the water is 996 ppm.

Example 6

The desalting and dehydrating system 1 is utilized to process heavy crude oil (the main properties of the heavy crude oil are shown in Table 2). The desalting and dehydrating system 1 comprises a washing and desalting device 10, a demulsifying device 20, and a separating device 30.

The ratio of the length of the first receiving cavity 111 to the diameter of the cross section of the first receiving cavity 111 is 45:1. The first receiving cavity 111 is provided with a plurality of oleophilic and hydrophobic filaments, the length direction of each of the oleophilic and hydrophobic filaments is consistent with the length direction of the first receiving cavity 111, and the filling density of the oleophilic and hydrophobic filaments is 3%. The through-holes of the demulsifying device 20 are circular holes. The ratio of the quantity of the oleophilic and hydrophobic filaments 321 to the quantity of the hydrophilic and oleophobic filaments 322 in the first separating module 320a of the separating device 30 is 1:1, and the ratio of the quantity of the oleophilic and hydrophobic filaments 321 to the quantity of the hydrophilic and oleophobic filaments 322 in the second separating module 320b of the separating device 30 is 1:1.

The crude oil is mixed with water to obtain an oil-water mixture, in which the weight percentage of the water phase is 1 wt %. The oil-water mixture is transferred into the washing and desalting device 10, so that the oil-water mixture flows over the surfaces of the filaments 120. Wherein the volumetric space velocity of the oil-water mixture is 20 $h^{-1}$, the temperature is 50° C., and the pressure is 0.1 MPaG, and the retention time of the oil-water mixture in the washing and desalting device 10 is 1 min.

The oil-water mixture flowing out of the washing and desalting device 10 (at 50° C. temperature) enters the demulsifying device 20 and is demulsified there, so as to obtain an oil phase (light phase) and a water phase (heavy phase). The retention time of the oil-water mixture in the demulsifying device 20 is 3 min.

The oil phase (at 50° C. temperature and 0.5 MPa pressure) enters the first separating module 320a and is separated there, and the water phase (at 50° C. temperature and 0.5 MPaG pressure) enters the second separating module 320b and is separated there. The retention time of the oil phase of the oil-water mixture in the separating device 30 is 5 min.

After washing, desalting, and oil-water separation of the oil-water mixture, the salt content in the crude oil (oil product) is 2.76 mg/L, the water content in the crude oil is 445 ppm, and the oil content in the water is 122 ppm.

Example 7

The desalting and dehydrating system 1 is utilized to process heavy crude oil (the main properties of the heavy crude oil are shown in Table 2). The desalting and dehydrating system 1 comprises a washing and desalting device 10, a demulsifying device 20, and a separating device 30. The differences of the desalting and dehydrating system 1 in the example 7 from the desalting and dehydrating system 1 in the example 6 are:

The ratio of the length of the first receiving cavity 111 to the diameter of the cross section of the first receiving cavity 111 is 70:1, and the filling density of the oleophilic and hydrophobic filaments is 9%; the through-holes of the demulsifying device 20 are triangular holes; the ratio of the quantity of the oleophilic and hydrophobic filaments 321 to the quantity of the hydrophilic and oleophobic filaments 322 in the first separating module 320a of the separating device 30 is 1:10, and the ratio of the quantity of the oleophilic and hydrophobic filaments 321 to the quantity of the hydrophilic and oleophobic filaments 322 in the second separating module 320b of the separating device 30 is 10:1.

The crude oil is mixed with water to obtain an oil-water mixture, in which the weight percentage of the water phase is 20 wt %. The oil-water mixture is transferred into the washing and desalting device 10, so that the oil-water mixture flows over the surfaces of the filaments 120. Wherein the volumetric space velocity of the oil-water mixture is 30 $h^{-1}$, the temperature is 200° C., and the pressure is 2 MPaG, and the retention time of the oil-water mixture in the washing and desalting device 10 is 5 min.

The oil-water mixture flowing out of the washing and desalting device 10 (at 200° C. temperature) enters the demulsifying device 20 and is demulsified there, so as to obtain an oil phase (light phase) and a water phase (heavy phase). The retention time of the oil-water mixture in the demulsifying device 20 is 0.5 min.

The oil phase (at 200° C. temperature and 2 MPa pressure) enters the first separating module 320a and is separated there, and the water phase (at 200° C. temperature and 2 MPaG pressure) enters the second separating module 320b and is separated there. The retention time of the oil phase of the oil-water mixture in the separating device 30 is 0.5 min.

After the oil-water mixture is washed and desalted and separated, the salt content in the crude oil (oil product) is 1.80 mg/L, the water content in the crude oil is 558 ppm, and the oil content in the water is 156 ppm.

Example 8

The desalting and dehydrating system 1 is utilized to process heavy crude oil (the main properties of the heavy crude oil are shown in Table 2). The desalting and dehydrating system 1 comprises a washing and desalting device 10, a demulsifying device 20, and a separating device 30. The differences of the desalting and dehydrating system 1 in the example 8 from the desalting and dehydrating system 1 in the example 6 are:

The plurality of filaments 120 arranged in the first receiving cavity 111 comprise oleophilic and hydrophobic filaments and metal filaments, the ratio of the length of the first receiving cavity 111 to the diameter of the cross section of the first receiving cavity 111 is 30:1, and the filling density of the filaments 120 is 1%; the through-holes of the demulsifying device 20 are quadrangular holes; the ratio of the quantity of the oleophilic and hydrophobic filaments 321 to the quantity of the hydrophilic and oleophobic filaments 322 in the first separating module 320a of the separating device 30 is 1:2, and the ratio of the quantity of the oleophilic and hydrophobic filaments 321 to the quantity of the hydrophilic and oleophobic filaments 322 in the second separating module 320b of the separating device 30 is 2:1.

The crude oil is mixed with water to obtain an oil-water mixture, in which the weight percentage of the water phase is 5 wt %. The oil-water mixture is transferred into the washing and desalting device 10, so that the oil-water mixture flows over the surfaces of the filaments 120. Wherein the volumetric space velocity of the oil-water mixture is 10 $h^{-1}$, the temperature is 5° C., and the pressure is 0.05 MPaG, and the retention time of the oil-water mixture in the washing and desalting device 10 is 0.5 min.

The oil-water mixture flowing out of the washing and desalting device 10 (at 5° C. temperature) enters the demulsifying device 20 and is demulsified there, so as to obtain an oil phase (light phase) and a water phase (heavy phase). The retention time of the oil-water mixture in the demulsifying device 20 is 5 min.

The oil phase (at 5° C. temperature and 0.1 MPa pressure) enters the first separating module 320a and is separated there, and the water phase (at 5° C. temperature and 0.1 MPaG pressure) enters the second separating module 320b and is separated there. The retention time of the oil phase of the oil-water mixture in the separating device 30 is 10 min.

After the oil-water mixture is washed and desalted and separated, the salt content in the crude oil (oil product) is 2.15 mg/L, the water content in the crude oil is 390 ppm, and the oil content in the water is 103 ppm.

Example 9

The desalting and dehydrating system 1 is utilized to process heavy crude oil (the main properties of the heavy crude oil are shown in Table 2). The desalting and dehydrating system 1 comprises a washing and desalting device 10, a demulsifying device 20, and a separating device 30. The differences of the desalting and dehydrating system 1 in the example 9 from the desalting and dehydrating system 1 in the example 8 are:

The ratio of the length of the first receiving cavity 111 to the diameter of the cross section of the first receiving cavity 111 is 100:1, and the filling density of the oleophilic and hydrophobic filaments is 5%; the through-holes of the demulsifying device 20 are regular hexagonal holes; the ratio of the quantity of the oleophilic and hydrophobic filaments 321 to the quantity of the hydrophilic and oleophobic filaments 322 in the first separating module 320a of the separating device 30 is 1:5, and the ratio of the quantity of the oleophilic and hydrophobic filaments 321 to the quantity of the hydrophilic and oleophobic filaments 322 in the second separating module 320b of the separating device 30 is 5:1.

The crude oil is mixed with water to obtain an oil-water mixture, in which the weight percentage of the water phase is 15 wt %. The oil-water mixture is transferred into the washing and desalting device 10, so that the oil-water mixture flows over the surfaces of the filaments 120. Wherein the volumetric space velocity of the oil-water mixture is 50 $h^{-1}$, the temperature is 80° C., and the pressure is 0.3 MPaG, and the retention time of the oil-water mixture in the washing and desalting device 10 is 2 min.

The oil-water mixture flowing out of the washing and desalting device 10 (at 80° C. temperature) enters the demulsifying device 20 and is demulsified there, so as to obtain an oil phase (light phase) and a water phase (heavy phase). The retention time of the oil-water mixture in the demulsifying device 20 is 1 min.

The oil phase (at 80° C. temperature and 1 MPa pressure) enters the first separating module 320a and is separated there, and the water phase (at 80° C. temperature and 1 MPaG pressure) enters the second separating module 320b and is separated there. The retention time of the oil phase of the oil-water mixture in the separating device 30 is 3 min.

After the oil-water mixture is washed and desalted and separated, the salt content in the crude oil (oil product) is 2.17 mg/L, the water content in the crude oil is 422 ppm, and the oil content in the water is 120 ppm.

Example 10

The desalting and dehydrating system 1 is utilized to process heavy crude oil (the main properties of the heavy crude oil are shown in Table 2). The desalting and dehydrating system 1 comprises a washing and desalting device 10, a demulsifying device 20, and a separating device 30. The differences of the desalting and dehydrating system 1 in the example 10 from the desalting and dehydrating system 1 in the example 9 are:

The ratio of the length of the first receiving cavity 111 to the diameter of the cross section of the first receiving cavity 111 is 10:1, and the filling density of the oleophilic and hydrophobic filaments is 4%; the ratio of the quantity of the oleophilic and hydrophobic filaments 321 to the quantity of the hydrophilic and oleophobic filaments 322 in the first separating module 320a of the separating device 30 is 1:4, and the ratio of the quantity of the oleophilic and hydrophobic filaments 321 to the quantity of the hydrophilic and oleophobic filaments 322 in the second separating module 320b of the separating device 30 is 4:1.

The crude oil is mixed with water to obtain an oil-water mixture, in which the weight percentage of the water phase is 10 wt %. The oil-water mixture is transferred into the washing and desalting device 10, so that the oil-water mixture flows over the surfaces of the filaments 120. Wherein the volumetric space velocity of the oil-water mixture is 5 h$^{-1}$, the temperature is 150° C., and the pressure is 0.5 MPaG, and the retention time of the oil-water mixture in the washing and desalting device 10 is 3 min.

The oil-water mixture flowing out of the washing and desalting device 10 (at 150° C. temperature) enters the demulsifying device 20 and is demulsified there, so as to obtain an oil phase (light phase) and a water phase (heavy phase). The retention time of the oil-water mixture in the demulsifying device 20 is 0.5 min.

The oil phase (at 150° C. temperature and 1.5 MPa pressure) enters the first separating module 320a and is separated there, and the water phase (at 150° C. temperature and 1.5 MPaG pressure) enters the second separating module 320b and is separated there. The retention time of the oil phase of the oil-water mixture in the separating device 30 is 1 min.

After the oil-water mixture is washed and desalted and separated, the salt content in the crude oil (oil product) is 2.24 mg/L, the water content in the crude oil is 440 ppm, and the oil content in the water is 117 ppm.

Example 11

The desalting and dehydrating system 1 is utilized to process coal tar (the main properties of the crude oil are shown in Table 3). The desalting and dehydrating system 1 in the example 11 is the same as the desalting and dehydrating system 1 in the example 6.

The crude oil is mixed with water to obtain an oil-water mixture, in which the weight percentage of the water phase is 1 wt %. The oil-water mixture is transferred into the washing and desalting device 10, so that the oil-water mixture flows over the surfaces of the filaments 120. Wherein the volumetric space velocity of the oil-water mixture is 10 h$^{-1}$, the temperature is 5° C., and the pressure is 0.05 MPaG, and the retention time of the oil-water mixture in the washing and desalting device 10 is 1 min.

The oil-water mixture flowing out of the washing and desalting device 10 (at 5° C. temperature) enters the demulsifying device 20 and is demulsified there, so as to obtain an oil phase (heavy phase) and a water phase (light phase). The retention time of the oil-water mixture in the demulsifying device 20 is 3 min.

The water phase (at 5° C. temperature and 0.1 MPa pressure) enters the first separating module 320a and is separated there, and the oil phase (at 5° C. temperature and 0.1 MPaG pressure) enters the second separating module 320b and is separated there. The retention time of the oil phase of the oil-water mixture in the separating device 30 is 5 min.

After the oil-water mixture is washed and desalted and separated, the salt content in the crude oil (oil product) is 2.98 mg/L, the water content in the crude oil is 2.74 wt %, and the oil content in the water is 0.542%.

Example 12

The desalting and dehydrating system 1 is utilized to process coal tar (the main properties of the crude oil are shown in Table 3). The differences of the desalting and dehydrating system 1 in the example 12 from the desalting and dehydrating system 1 in the example 7 are: the ratio of the quantity of the hydrophilic and oleophobic filaments 322 to the quantity of the oleophilic and hydrophobic filaments 321 in the first separating module 320a is 1:10, and the ratio of the quantity of the hydrophilic and oleophobic filaments 322 to the quantity of the oleophilic and hydrophobic filaments 321 in the second separating module 320b is 10:1.

The crude oil is mixed with water to obtain an oil-water mixture, in which the weight percentage of the water phase is 20 wt %. The oil-water mixture is transferred into the washing and desalting device 10, so that the oil-water mixture flows over the surfaces of the filaments 120. Wherein the volumetric space velocity of the oil-water mixture is 50 h$^{-1}$, the temperature is 200° C., and the pressure is 2 MPaG, and the retention time of the oil-water mixture in the washing and desalting device 10 is 5 min.

The oil-water mixture flowing out of the washing and desalting device 10 (at 200° C. temperature) enters the demulsifying device 20 and is demulsified there, so as to obtain an oil phase (heavy phase) and a water phase (light phase). The retention time of the oil-water mixture in the demulsifying device 20 is 0.5 min.

The water phase (at 200° C. temperature and 2 MPa pressure) enters the first separating module 320a and is separated there, and the oil phase (at 200° C. temperature and 2 MPaG pressure) enters the second separating module 320b and is separated there. The retention time of the oil phase of the oil-water mixture in the separating device 30 is 0.5 min.

After the oil-water mixture is washed and desalted and separated, the salt content in the crude oil (oil product) is 2.23 mg/L, the water content in the crude oil is 1.79 wt %, and the oil content in the water is 0.363%.

Example 13

The desalting and dehydrating system 1 is utilized to process coal tar (the main properties of the crude oil are shown in Table 3). The differences of the desalting and dehydrating system 1 in the example 13 from the desalting and dehydrating system 1 in the example 8 are: the ratio of the quantity of the hydrophilic and oleophobic filaments 322 to the quantity of the oleophilic and hydrophobic filaments 321 in the first separating module 320a is 1:2, and the ratio of the quantity of the hydrophilic and oleophobic filaments 322 to the quantity of the oleophilic and hydrophobic filaments 321 in the second separating module 320b is 2:1.

The crude oil is mixed with water to obtain an oil-water mixture, in which the weight percentage of the water phase is 5 wt %. The oil-water mixture is transferred into the washing and desalting device 10, so that the oil-water mixture flows over the surfaces of the filaments 120. Wherein the volumetric space velocity of the oil-water mixture is 5 h$^{-1}$, the temperature is 50° C., and the pressure is 0.1 MPaG, and the retention time of the oil-water mixture in the washing and desalting device 10 is 0.5 min.

The oil-water mixture flowing out of the washing and desalting device 10 (at 50° C. temperature) enters the demulsifying device 20 and is demulsified there, so as to obtain an oil phase (heavy phase) and a water phase (light phase). The retention time of the oil-water mixture in the demulsifying device 20 is 5 min.

The water phase (at 50° C. temperature and 0.5 MPa pressure) enters the first separating module 320a and is separated there, and the oil phase (at 50° C. temperature and 0.5 MPaG pressure) enters the second separating module 320b and is separated there. The retention time of the oil phase of the oil-water mixture in the separating device 30 is 10 min.

After the oil-water mixture is washed and desalted and separated, the salt content in the crude oil (oil product) is 2.96 mg/L, the water content in the crude oil is 2.58 wt %, and the oil content in the water is 0.417%.

Example 14

The desalting and dehydrating system 1 is utilized to process coal tar (the main properties of the crude oil are shown in Table 3). The differences of the desalting and dehydrating system 1 in the example 14 from the desalting and dehydrating system 1 in the example 9 are: the ratio of the quantity of the hydrophilic and oleophobic filaments 322 to the quantity of the oleophilic and hydrophobic filaments 321 in the first separating module 320a is 1:5, and the ratio of the quantity of the hydrophilic and oleophobic filaments 322 to the quantity of the oleophilic and hydrophobic filaments 321 in the second separating module 320b is 5:1.

The crude oil is mixed with water to obtain an oil-water mixture, in which the weight percentage of the water phase is 15 wt %. The oil-water mixture is transferred into the washing and desalting device 10, so that the oil-water mixture flows over the surfaces of the filaments 120. Wherein the volumetric space velocity of the oil-water mixture is 30 $h^{-1}$, the temperature is 150° C., and the pressure is 0.5 MPaG, and the retention time of the oil-water mixture in the washing and desalting device 10 is 2 min.

The oil-water mixture flowing out of the washing and desalting device 10 (at 150° C. temperature) enters the demulsifying device 20 and is demulsified there, so as to obtain an oil phase (heavy phase) and a water phase (light phase). The retention time of the oil-water mixture in the demulsifying device 20 is 1 min.

The water phase (at 150° C. temperature and 1.5 MPa pressure) enters the first separating module 320a and is separated there, and the oil phase (at 150° C. temperature and 1.5 MPaG pressure) enters the second separating module 320b and is separated there. The retention time of the oil phase of the oil-water mixture in the separating device 30 is 3 min.

After the oil-water mixture is washed and desalted and separated, the salt content in the crude oil (oil product) is 1.88 mg/L, the water content in the crude oil is 1.02 wt %, and the oil content in the water is 0.224%.

Example 15

The desalting and dehydrating system 1 is utilized to process coal tar (the main properties of the crude oil are shown in Table 3). The differences of the desalting and dehydrating system 1 in the example 15 from the desalting and dehydrating system 1 in the example 10 are: the ratio of the quantity of the hydrophilic and oleophobic filaments 322 to the quantity of the oleophilic and hydrophobic filaments 321 in the first separating module 320a is 1:4, and the ratio of the quantity of the hydrophilic and oleophobic filaments 322 to the quantity of the oleophilic and hydrophobic filaments 321 in the second separating module 320b is 4:1.

The crude oil (the main properties of the crude oil are shown in Table 3) is mixed with water to obtain an oil-water mixture, in which the weight percentage of the water phase is 10 wt %. The oil-water mixture is transferred into the washing and desalting device 10, so that the oil-water mixture flows over the surfaces of the filaments 120. Wherein the volumetric space velocity of the oil-water mixture is 20 $h^{-1}$, the temperature is 80° C., and the pressure is 0.3 MPaG, and the retention time of the oil-water mixture in the washing and desalting device 10 is 3 min.

The oil-water mixture flowing out of the washing and desalting device 10 (at 80° C. temperature) enters the demulsifying device 20 and is demulsified there, so as to obtain an oil phase (heavy phase) and a water phase (light phase). The retention time of the oil-water mixture in the demulsifying device 20 is 0.5 min.

The water phase (at 80° C. temperature and 1 MPa pressure) enters the first separating module 320a and is separated there, and the oil phase (at 80° C. temperature and 1 MPaG pressure) enters the second separating module 320b and is separated there. The retention time of the oil phase of the oil-water mixture in the separating device 30 is 1 min.

After the oil-water mixture is washed and desalted and separated, the salt content in the crude oil (oil product) is 1.95 mg/L, the water content in the crude oil is 1.05 wt %, and the oil content in the water is 0.238%.

Comparative Example 4

The three-stage electrodesalting and electrodehydrating apparatus in the comparative example 1 is used to carry out desalting and dehydration for crude oil (the main properties of the crude oil are shown in Table 3). The operating conditions are as follows: operating temperature: 70-75° C.; operating pressure: 0.8-1.2 MPaG; retention time: 36 min.; the total amount of injected water is 15 wt % of the mass of the raw oil. It is found that the oil-water interface is not clear and the released water phase carry a large amount of oil phase in the desalting and dehydration process. After the dehydration, the salt content in the coal tar is 19.8 mg/L, and the water content is 20,500-28,400 ppm.

Comparative Example 5

The prior art is used. The crude oil (the main properties of the crude oil are shown in Table 3) and the injected water are mixed for three times with a static mixer first, the oil-water mixture obtained through the mixing is introduced into a coalescing separator filled with 6 Pall coalescing filtering elements, and a filling material for corrugated plate separation is filled after the filtering elements. The apparatus is utilized to carry out desalting and dehydration for crude oil (the main properties of the crude oil are shown in Table 3). The operating conditions are as follows: operating temperature: 45-70° C.; operating pressure: 0.5-0.8 MPaG; retention time: 28 min.; the total amount of injected water is 5 wt % of the mass of the raw oil.

Coalescing dehydration is carried out with the Pall coalescing filtering elements. In the water-injection desalting and coalescing separation process, it is found that the oil-water interface is not clear in the oil-water separation, and the released water phase carries a large amount of oil phase. After washing by water injection, the salt content in the coal tar is 19 mg/L-19.7 mg/L, the water content is 19,800-27,200 ppm, and the oil content in the water is 0.597%.

TABLE 3

Main Properties of the Coal Tar

| | |
|---|---|
| Density (at 20° C.)/g · cm$^{-3}$ | 1.02 |
| Kinematic viscosity (60° C.)/mm$^2$ · s$^{-1}$ | 65 |
| Kinematic viscosity (80° C.)/mm$^2$ · s$^{-1}$ | 12.1 |
| Solidifying point, ° C. | 24 |
| Precipitate (%) | 0.4 |
| Distillation range/° C. | |
| IBP/10% | 190/258 |
| 30%/50% | 334/377 |
| 70%/90% | 437/585 |
| 95%/EBP | —/750 |
| Salt content, mg/L | 18.2 |
| Water content, wt % | 2-4.5 |

Thus it can be seen that the desalting and dehydrating system 1 disclosed in the present disclosure can be used for deep desalting and dehydration of oil products such as common raw oil, heavy/inferior raw oil, and special heavy/inferior raw oil, etc. Compared with the traditional electrodesalting and coalescing desalting techniques, the desalting and dehydrating system 1 disclosed in the present disclosure has advantages including smaller amount of injected water, shorter retention time, better desalting and dehydration effect, less waste water, less sump oil, lower energy consumption, and deep desalting and dehydration; for oil products such as special heavy/inferior raw oil, etc., the expected technical indexes of desalting and dehydration can't be achieved with the traditional desalting and dehydrating techniques owing to the high density, high viscosity, complex composition, and severe emulsification of the oil products. In contrast, with the method disclosed in the present disclosure, depth desalting and dehydration can be realized, and finally the water removal rate in the oil product can be as high as 99% or above, and the salt content can be lower than 3 mg/L.

In the description of the present disclosure, it should be understood that the orientation or position relations indicated by terms "center", "longitudinal", "transverse", "length", "width", "thickness", "above", "below", "front" "back" "left", "right", "vertical", "horizontal", "top", "bottom", "inside", "outside", "clockwise", "counter-clockwise", "axial", "radial", or "circumferential", etc., are based on the orientation or position relations indicated in the accompanying drawings. They are used only to ease and simplify the description of the present disclosure, rather than indicating or implying that the involved device or component must have a specific orientation or must be constructed and operated in a specific orientation. Therefore, the use of these terms shall not be deemed as constituting any limitation to the present disclosure.

In addition, the terms "first" and "second" are used only for description purpose, and shall not be interpreted as indicating or implying relative importance or implicitly indicating the quantity of the indicated technical feature. Hence, a feature confined by "first" or "second" may explicitly or implicitly comprise at least one such feature. In the description of the present disclosure, "a plurality of" or "multiple" means at least two, such as two or more, etc., unless otherwise specified explicitly. In the present disclosure, unless otherwise specified and defined explicitly, the terms "install", "link", "connect", "fix", etc. shall be interpreted in their general meaning. For example, the connection may be fixed connection, detachable connection, or integral connection; may be mechanical connection or electrical connection or in communication with each other; may be direct connection or indirect connection via an intermediate medium, or internal communication or interactive relation between two elements. Those having ordinary skills in the art may interpret the specific meanings of the terms in the present disclosure in their context.

In the present disclosure, unless otherwise specified and defined explicitly, a first feature "above" or "below" a second feature may represent that the first feature and the second feature directly contact with each other or the first feature and the second feature contact with each other indirectly via an intermediate medium. In addition, a first feature "above" or "over" a second feature may represent that the first feature is right above or diagonally above the second feature, or may only represent that the elevation of the first feature is higher than that of the second feature. A first feature being "below" or "under" a second feature may represent that the first feature is right below or diagonally below the second feature, or may only represent that the elevation of the first feature is lower than that of the second feature.

In the description of the present disclosure, the expressions of reference terms "an embodiment", "some embodiments", "an example", "specific example", or "some examples" mean that the specific features, structures, materials or characteristics described in those embodiments or examples are included in at least one embodiment or example of the present disclosure. In this document, the exemplary expression of the above terms may not necessarily refer to the same embodiment or example. Moreover, the specific features, structures, materials, or characteristics described can be combined appropriately in any one or more embodiments or examples. Furthermore, those skilled in the art may combine or assemble different embodiments or examples and features in different embodiments or examples described herein, provided that there is no conflict among them.

While the present disclosure is illustrated and described above in embodiments, it should be understood that the embodiments are exemplary only and shall not be deemed as constituting any limitation to the present disclosure. Those skilled in the art can made variations, modifications, and replacements to the embodiments within the scope of the present disclosure.

The invention claimed is:

1. A desalting and dehydrating system, comprising:
a washing and desalting device,
a demulsifying device, and
a separating device,
wherein the washing and desalting device comprises:
a first shell having a first receiving cavity, and is provided with a first liquid inlet and a first liquid outlet that are in communication with the first receiving cavity, and a plurality of filaments disposed in a longitudinal direction of the first receiving cavity at a filling density of 1%-9%,
wherein the demulsifying device comprises:
a second shell having a second receiving cavity, and is provided with a second liquid inlet and a second liquid outlet that are in communication with the second receiving cavity, wherein the second liquid inlet is in communication with the first liquid outlet; and a demulsifying module disposed in the second receiving cavity, wherein the demulsifying module is made of an oleophilic and hydrophobic material or a hydrophilic and oleophobic material and has a plurality of through-holes, wherein the separating device comprises:
a third shell having a third receiving cavity, and is provided with a third liquid inlet, a light phase outlet and a heavy phase outlet that are in communication with the second liquid outlet; and
a first separating module and a second separating module, each of which comprises a fiber braided layer woven from oleophilic and hydrophobic filaments and hydrophilic and oleophobic filaments that are arranged in an intersecting manner to form intersections, wherein the first separating module and the second separating module are arranged in the third receiving cavity, and the third liquid inlet is disposed between the first separating module and the second separating module.

2. The desalting and dehydrating system of claim 1, wherein the demulsifying module further comprises a plurality of demulsifying parts, wherein:
the plurality of demulsifying parts are stacked together, each of the demulsifying parts is in a plate shape or sheet shape;
or, the plurality of demulsifying parts are connected sequentially, and the demulsifying module is formed in a wave shape;
or, each of the demulsifying parts is in a cylindrical shape.

3. The desalting and dehydrating system of claim 1, wherein:
in the first separating module, a ratio of a quantity of light-phase affiliative filaments to a quantity of heavy-phase affiliative filaments is 1:(1-10), and
in the second separating module, a ratio of a quantity of light-phase affiliative filaments to a quantity of heavy-phase affiliative filaments is (1-10):1.

4. The desalting and dehydrating system of claim 1, further comprising:
a first liquid distributor arranged in the third receiving cavity, and is disposed upstream of the first separating module, and comprises a plurality of first orifice plates stacked together, each of the first orifice plates is arranged horizontally, a diameter of each first orifice plate is 4 mm-8 mm, and a center distance between two adjacent holes of each first orifice plate is 20 mm-30 mm; and
a second liquid distributor arranged in the third receiving cavity, and disposed upstream of the second separating module, wherein the third liquid inlet is disposed between the first liquid distributor and the second liquid distributor, and the second liquid distributor comprises a plurality of second orifice plates stacked together.

5. The desalting and dehydrating system of claim 1, further comprising:
a plurality of perforated corrugated plates disposed downstream of the second separating module and arranged in a spaced manner in a predetermined direction in the third receiving cavity, and pores of the perforated corrugated plates are arranged at wave troughs of the perforated corrugated plates.

6. The desalting and dehydrating system of claim 1, further comprising:
a mixer having a mixing cavity, wherein a light phase inlet is provided in a bottom wall surface of the mixer, a heavy phase inlet is provided in a side wall surface of the mixer, and a liquid outlet of the mixer communicates with the first liquid inlet, a disturbing member is provided in the mixing cavity, and the disturbing member is selected from the group consisting of spiral plates, corrugated plates, rotating blades, flat blades, curved blades, perforated plates, and swirling assembly.

7. The desalting and dehydrating system of claim 1, wherein the washing and desalting device further comprises:
a first mounting member and a second mounting member that are affixed inside the first receiving cavity in a spaced manner in the longitudinal direction of the first receiving cavity, wherein a first end of each filament is connected with the first mounting member, and a second end of each filament is connected with the second mounting member, the first end of each filament is adjacent to the first liquid inlet, and the second end of each filament is adjacent to the first liquid outlet, and/or
a first material distributor provided in the first receiving cavity and disposed between the first liquid inlet and the first end of the filament, wherein a liquid inlet of the first material distributor is in communication with the first liquid inlet.

8. The desalting and dehydrating system of claim 1, wherein the first shell further comprises a circulating liquid outlet in communication with the first receiving cavity, and the washing and desalting device further comprises a circulating pump having an inlet connected with the circulating liquid outlet and an outlet connected to the first liquid inlet.

9. The desalting and dehydrating system of claim 1, wherein a cross sectional area of the first receiving cavity is circular in shape, and a ratio of a length of the first receiving cavity to a diameter of the cross sectional area of the first receiving cavity is (10-100):1.

10. The desalting and dehydrating system of claim 1, wherein:
each of the plurality of filament is an oleophilic and hydrophobic filament, or
the plurality of filaments includes oleophilic and hydrophobic filaments and metal filaments.

11. The desalting and dehydrating system of claim 1, wherein the second shell and the demulsifying module are arranged horizontally.

12. The desalting and dehydrating system of claim 1, wherein at least a part of an edge of each through-hole is linear.

13. The desalting and dehydrating system of claim 12, wherein the plurality of through-holes are polygonal holes.

14. The desalting and dehydrating system of claim 1, wherein the demulsifying module is curled into a spiral shape.

15. The desalting and dehydrating system of claim 1, wherein a surface porosity of the demulsifying module is 50%-95.

16. The desalting and dehydrating system of claim 1, wherein each of the first separating module and the second separating module comprises a plurality of the fiber braided layers stacked together.

17. The desalting and dehydrating system of claim 1, wherein the oleophilic and hydrophobic filaments are made of at least one of materials selected from the group consisting of polyester, polyethylene, polypropylene, polyvinyl chloride, polytetrafluoroethylene, acrylics, and nylon, and the hydrophilic and oleophobic filaments are polypropylene filaments.

18. The desalting and dehydrating system of claim 1, wherein the oleophilic and hydrophobic filaments and the hydrophilic and oleophobic filaments are woven in an X-pattern, V-pattern, splay pattern, Q-pattern, water-drop pattern, or diamond pattern.

19. The desalting and dehydrating system of claim 1, wherein the first separating module and the second separating module are spaced from each other so that a steady flow area is formed between the first separating module and the second separating module, and the third liquid inlet in communication with the steady flow area.

* * * * *